Oct. 28, 1969     H. O. FUCHS     3,474,667
ENGINE IGNITION SYSTEM PERFORMANCE MONITOR
Filed Oct. 26, 1967     9 Sheets-Sheet 2

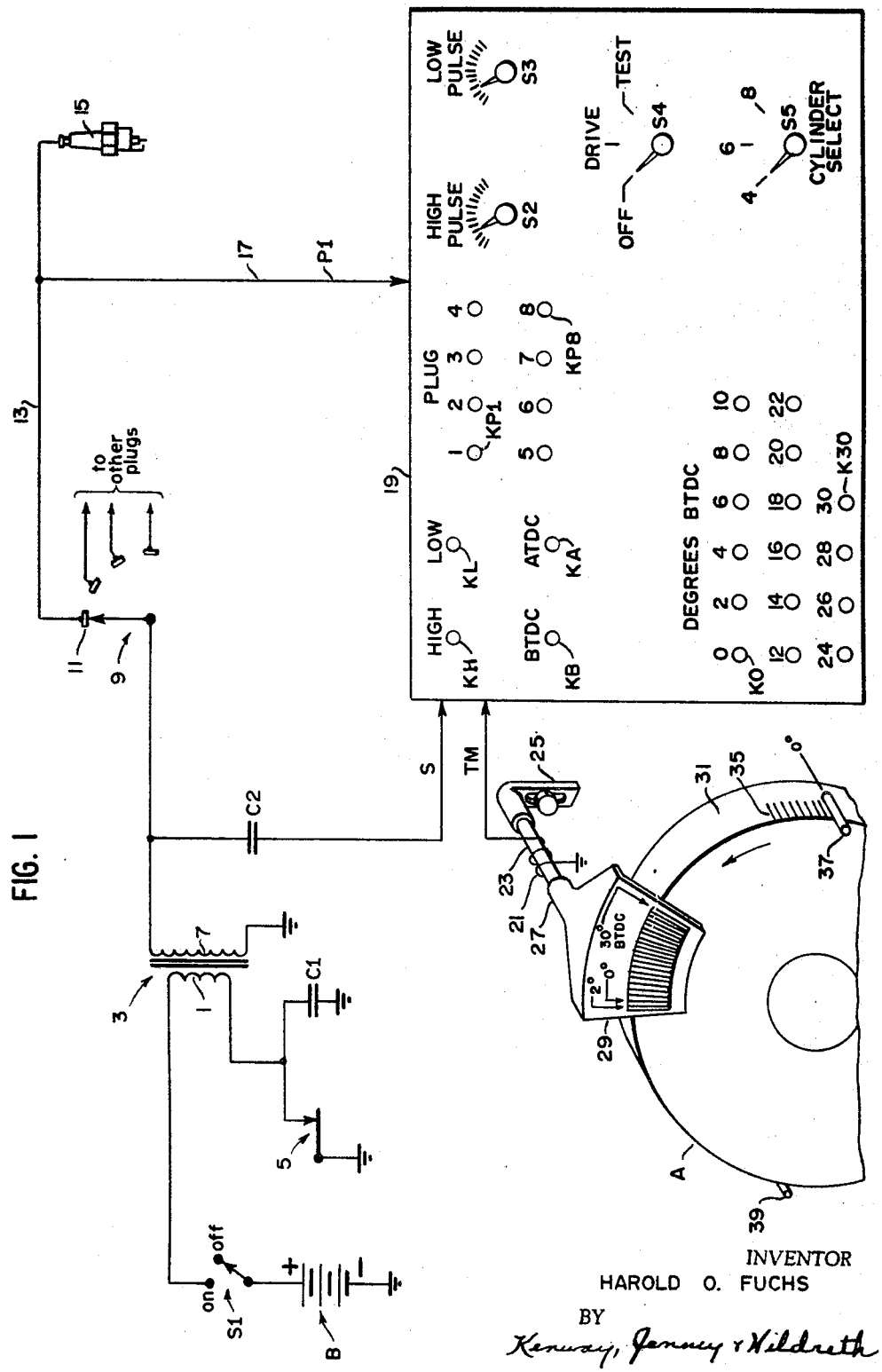

INVENTOR
HAROLD O. FUCHS

BY

Kenway, Jenney & Hildreth

ATTORNEYS

Oct. 28, 1969   H. O. FUCHS   3,474,667
ENGINE IGNITION SYSTEM PERFORMANCE MONITOR
Filed Oct. 26, 1967   9 Sheets-Sheet 4

INVENTOR
HAROLD O. FUCHS
BY
Kenway, Jenney & Hildreth
ATTORNEYS

INVENTOR
HAROLD O. FUCHS
ATTORNEYS

Oct. 28, 1969 H. O. FUCHS 3,474,667
ENGINE IGNITION SYSTEM PERFORMANCE MONITOR
Filed Oct. 26, 1967 9 Sheets-Sheet 9
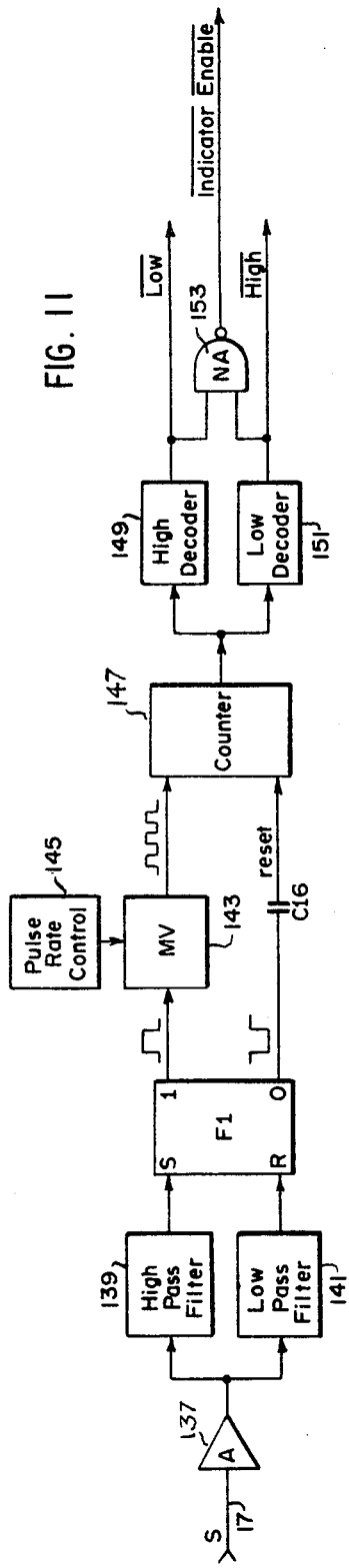
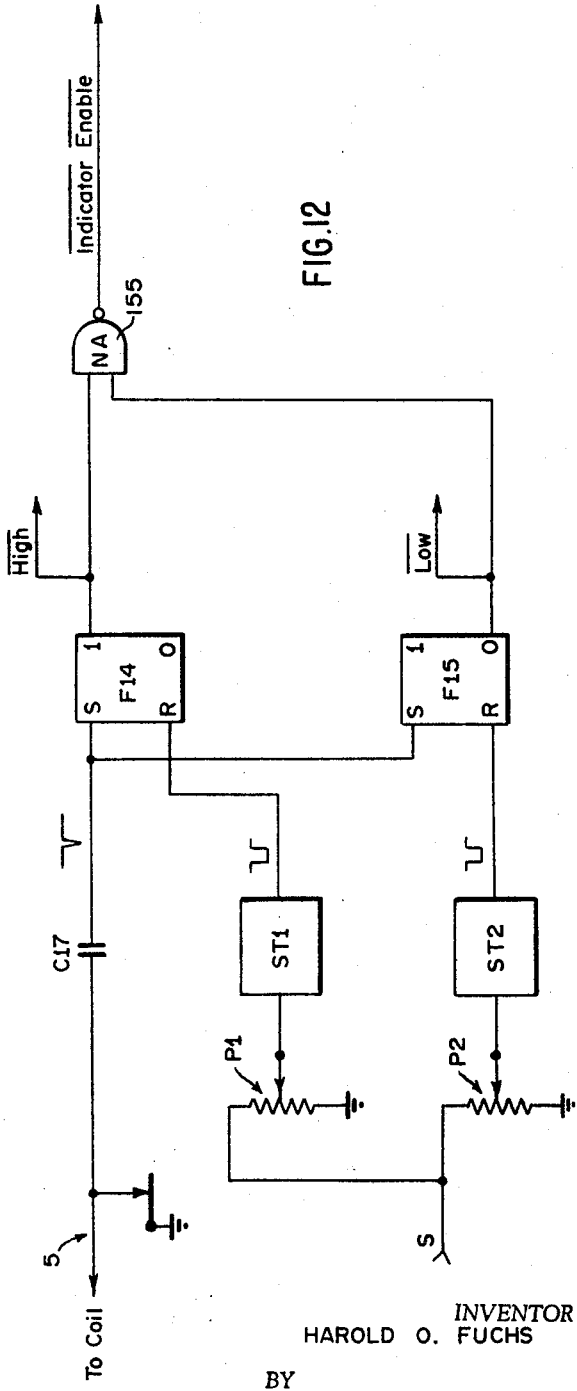
INVENTOR
HAROLD O. FUCHS
BY
Kenway, Jenney & Hildreth
ATTORNEYS

United States Patent Office 3,474,667
Patented Oct. 28, 1969

3,474,667
ENGINE IGNITION SYSTEM PERFORMANCE MONITOR
Harold O. Fuchs, Taylor Hill Road,
New Boston, N.H. 03070
Filed Oct. 26, 1967, Ser. No. 678,314
Int. Cl. G01n *15/00;* G01r *13/42*
U.S. Cl. 73—116
14 Claims

ABSTRACT OF THE DISCLOSURE

An engine performance monitor comprising electronic circuits for forming a pulse having a width equal to the duration of the radio frequency portion of an ignition spark discharge. Apparatus is provided for indicating whether or not the duration of this pulse is between the durations of two standard comparison pulses. Means are provided for correlating the spark time with crankshaft angle and indicating the timing of an ignition system with respect to top dead center of a reference cylinder. The full specification must be consulted for an understanding of the invention.

My invention relates to the performance testing of engines having spark ignition systems, and particularly to a novel system for monitoring the spark characteristics and timing of an ignition system.

In an internal combustion engine having a spark ignition system, both the timing of the spark with respect to the position of the piston in the cylinder and the waveform of the spark discharge are directly correlated with the performance of the engine. Proper operation requires the spark to occur at an optimum time during the travel of the piston toward top dead center that is characteristic of the engine and of its speed of operation. When the spark occurs, it must be of the proper intensity and duration to ignite the fuel mixture. Too weak a spark will result in misfiring, whereas a spark that is unnecessarily intense will cause wear of the electrodes. Service men have long been aware of the desirability of adjusting and maintaining an engine to produce these desirable spark characteristics.

However, prior to my invention, so far as I am aware, only relatively elaborate, cumbersome and expensive apparatus has been available for the purpose. Commonly, an oscilloscope is used to present a display of the waveform produced by a spark discharge. However, the proper evaluation of the oscilloscope trace requires considerable skill and experience. Moreover, the oscilloscope itself is usually large and cumbersome, and requires the attention of an operator, both in connecting it to the ignition system and in observing the results as they are produced. It is the object of my invention to facilitate the evaluation of the performance of an engine by an operator who does not have any particular skill or training, and who at the time may be driving an automobile in which the engine is mounted.

Briefly, the above and other objects of my invention are attained by apparatus which takes advantage of features that I have observed in the waveform of a normal spark discharge. Specifically, opening the breaker points in the primary circuit of a conventional automobile ignition system results in a series of radio frequency oscillations in the primary circuit which are damped out as the spark discharge occurs in the secondary circuit. These radio frequency oscillations are followed by a burst of lower frequency oscillations in the primary circuit that are in turn damped out. The apparatus of my invention comprises means for measuring the duration of the high frequency portion of the spark waveform.

Preferably, I provide a circuit coupled to the secondary of the ignition coil to sense the first large transient occurring in the secondary when the breaker points are opened, and the smaller transient which occurs at the end of the sparking period when the spark is extinguished. These transients are applied to a squaring circuit, such as a flip-flop or the like, which is set at the beginning of the spark interval and reset at the end, thereby producing a square pulse having a duration equal to the duration of the spark. Apparatus is provided for producing two comparison pulses, one longer in duration than the spark pulse should be and one shorter than it should be. Means are provided for indicating the location of any plug producing a pulse that is too long or too short, and indicating whether it is too long or too short. The measurement just mentioned is made each time a plug fires.

A reference plug is used to keep track of the plugs that are firing. For this purpose, a connection is made to the high tension lead for the reference plug, and a reference plug is produced each time it is fired. I further provide a counter, and gate means for using the counter to perform two functions at different times. First, the counter is used to keep track of the plugs that are being fired, so that the appropriate indication can be produced for each measurement that is made.

At the end of a cycle of firing, and before the next firing of the reference plug, the timing of the sparks is measured. For this purpose I provide a pulse generator synchronized with the engine crankshaft for producing a sequence of pulses each marking a different position of a reference piston with respect to top dead center. After the last plug in a sequence is fired, and before the reference plug is fired, these timing pulses are gated into the counter. When the reference plug is fired, the registered count is transferred to a timing count register. Apparatus is provided that responds to the contents of this register to indicate the firing angle with respect to top dead center. If desired, apparatus may be provided for continuing to count timing after top dead center, although for most purposes it is merely sufficient to indicate that a firing after top dead center has occurred, as that would ordinarily represent a malfunction or improper adjustment of the engine.

As will appear, the apparatus of my invention may be principally assembled from conventional integrated circuits that are reliable, readily available and relatively inexpensive. The bulk of the apparatus may thereby be mounted in a small housing that can be located on the dashboard of the automobile. It will be apparent that the indications provided are of a nature that can be readily interpreted by an untrained operator, as they may be read directly in terms of engine performance.

The manner in which the apparatus of my invention is constructed, and its mode of operation will best be understood in the light of the following detailed description, together with the accompanying drawings, of a preferred embodiment and various modifications thereof.

In the drawings,

FIG. 1 is a schematic block and wiring diagram of an engine performance monitor in accordance with my invention, shown in its relation to a conventional ignition system;

FIGS. 2a and 2b comprise graphs showing the waveforms appearing in the primary and secondary windings, respectively, of an ignition coil;

FIG. 11 is a schematic diagram of modified spark time measuring and comparison apparatus suitable for use in the apparatus of FIG. 3;

FIG. 12 is another modification of spark time measuring and comparison apparatus alternatively useful in the apparatus of FIG. 3.

Figure 5:
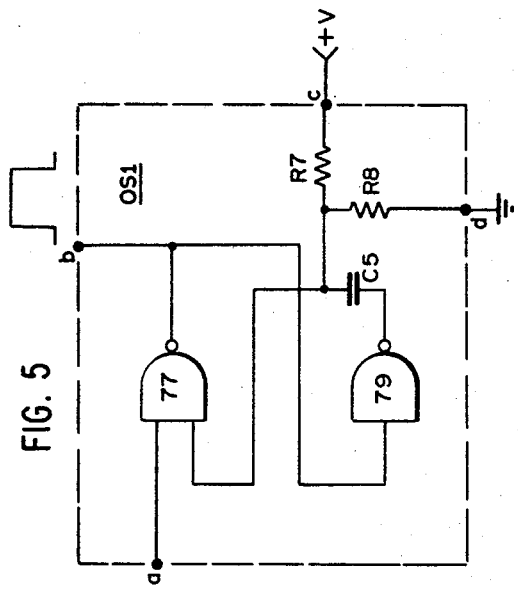
FIG. 5 is a wiring diagram of a monostable multivibrator suitable for use in the apparatus of FIG. 4.

Referring to FIG. 1, I have somewhat schematically shown the relationship of the apparatus of my invention to the ignition system of an automobile engine or other similar spark ignited engine. The conventional apparatus comprises a battery B, having its negative terminal grounded, as to the frame of the automobile, and its positive terminal connected to an ignition switch S1. When the switch S1 is closed, a primary circuit is completed that extends from the positive terminal of the battery through the primary winding 1 of an ignition coil 3, thence through breaker points schematically indicated at 5 to ground. A conventional capacitor C1 is connected across the breaker points.

The ignition transformer 3 comprises a secondary winding 7 having one terminal connected to ground and the other terminal connected to the arm of a distributor schematically indicated at 9. The number of contacts in the distributor would be determined by the number of cylinders, conventionally four, six or eight. Each of the contacts such as 11 is connected by a high tension lead such as 13 to one of the spark plugs such as the plug 15. Plug 15 will be considered as plug 1 in the firing order.

An electrical signal P1 is produced on a lead 17, connected to the high tension lead 13, when the plug 15 is fired. The signal P1 is applied to performance testing apparatus shown in block form at 19 and to be described in more detail below.

A signal S produced each time the breaker points 5 are opened is applied to the apparatus 19 through a capacitive connection, schematically indicated as a capacitor C2, on the high voltage side of the secondary winding 7. This capacitive coupling C2 may be made by a clamp connected around the outside of the insulation on the high tension lead from the coil 3.

In order to measure the timing of the sparks, a series of timing pulses TM are applied to the apparatus 19. The signals TM are produced across a coil 21 wound around a bar magnet 23. One end of the bar magnet 23 is mounted in a ferromagnetic bracket 25 that is bolted to the engine block. The other end of the magnet 23 is mounted in and supports a ferromagnetic pickup element 27 that has a broad depending portion 29 confronting and mounted adjacent to the vibration damper 31 of the engine. The vibration damper 31 rotates in the direction shown by the arrow when the engine is running.

The pickup element 29 may be made of annealed ferromagnetic material, and is preferably stamped with serrations such as 33 along radii about the central axis A of the vibration damper 31. Instead of serrations, slots may be provided.

The vibration damper 31 is conventionally provided with index marks such as 35 to assist in the timing of the engine. At the zero degree index mark is mounted a small rod 37, for example, one thirty-second of an inch in diameter and a quarter of an inch long, of magnetic material. The rod 37 may be attached to the vibration damper by any suitable conventional means, such as an epoxy resin or the like. Preferably, the face of the pickup 29 is arranged to clear the vibration damper 31 by about a sixteenth of an inch, and the rod 37 protrudes over the edge of the vibration damper sufficiently to just clear the serrations on the element 29 and thereby generate pulses in the coil 21. Preferably, 17 serrations 33 are provided to produce timing pulses at intervals of two degrees from thirty degrees from top dead center to two degrees past top dead center.

Preferably, a compensating mass 39 of the same weight as the bar 37 is provided 180° away from the bar 37 on the vibration damper 31. The purpose is to maintain the vibration damper in balance. It will be apparent that the pulse generator just described can be installed with little difficulty on engines having vibration dampers of various size.

The apparatus 19 responds to the signals P1, S and TM to produce a number of indications indicative of the performance of the engine. These indications are preferably provided by a series of lamps mounted on the front of the housing of the apparatus 19 to be visible to the operator.

When a spark that is too short is produced, indicating unduly high resistance in the spark discharge circuit, a "HIGH" indicating lamp KH is illuminated. If the spark is too long, indicating an unduly low resistance, a "LOW" indicating lamp KL is illuminated. Two lamps KB and KA indicate the firing of a cylinder that occurs before top dead center and after top dead center, respectively. Eight plug identification indicator lamps KP1 through KP8 are preferably provided. Means are provided for illuminating each of these lamps when the corresponding plug is fired. A further condition on the illumination of the plug indicator lamps is determined by the setting of a switch S4, to be described. Depending on the position of the switch S4, each lamp may be illuminated only if the spark duration is within tolerance, or only if it is not within tolerance. Sixteen angle indicating lamps K0 through K30 are provided, each indicating when lit the firing of the engine at the corresponding angular position relative to top dead center.

Four control switches are provided on the front panel of the apparatus 19. These include a "HIGH PULSE" switch S2 and a "LOW PULSE" switch S3. The switches S2 and S3 are each preferably provided with ten positions, and control the width of the two comparison pulses used to decide whether the duration of the spark is too long or too short. The "HIGH PULSE" switch S2 is selected to produce a pulse of duration shorter than the spark should be. The "LOW PULSE" switch is used to select a pulse width longer than the duration of a proper spark.

A three-position switch S4 is provided that is settable to an OFF position, in which the apparatus is disconnected, a DRIVE position, and a TEST position. In the DRIVE position of the switch, no indicating lamps are lit as long as the engine is performing properly. The purpose is to avoid unnecessarily distracting the operator during normal operation of a vehicle in which the apparatus is mounted. Should a spark be produced that is too long or too short, one of the plug indicator lamps KP1 through KP8 will be lit to indicate that service is needed. The firing angle is not monitored in the DRIVE position.

In the TEST position of the switch S4, both the spark duration and the firing angle are monitored. In this position of the switch S4, the lamps KP1 through KP8 light only when a proper spark is produced. In this position of the switch, both the firing angle at constant speed and the automatic spark advance as engine speed is increased can be observed.

A three-position switch S5 is used to select the number of cylinders in the engine with which the apparatus 19 is to be used. Conventionally, either four, six or eight cylinders would be provided. The switch S5, when set to the position corresponding to a given number of cylinders, completes the necessary circuits for the testing of an engine with that many cylinders, in a manner that will be described below.

FIG. 2a shows the waveform seen by an oscilloscope connected across the primary winding 1 of the ignition coil 3. When the breaker points 5 are closed, current from the battery B flows through the primary winding of the ignition coil and builds up a magnetic field proportional to the current. When the points 5 open, at the point A in FIG. 2a, the magnetic field in the primary winding collapses and a high voltage of perhaps 20,000 volts or more is induced in the secondary winding 7. This voltage is applied through the distributor 9 to a plug such as 15. The space between the points of the spark plug is ionized, causing a spark discharge to occur across the gap and ignite the fuel mixture in the cylinder. The spark discharge occurs first from the center electrode of the spark plug across the gap to the ground electrode, and then from the ground electrode across the gap to the center electrode. Each successively oppositely directed discharge involves a smaller current, resulting in a damped oscillation in the primary circuit, between the times A and B in FIG. 2a, at a radio frequency of 50 kHz. or more, until the amplitude of the voltage is too small to maintain a spark discharge across the gap. When the spark discharge ceases, the remaining energy in the spark coil is dissipated in the form of a damped low frequency oscillation in the vicinity of 1200 Hz., as indicated between the points B and C in FIG. 2a. When the breaker points 5 first close, they will bounce for a time and produce an oscillatory voltage, as illustrated between points D and E in FIG. 2a.

FIG. 2b shows the waveform appearing across the secondary winding 7, and comprising the signal S in FIG. 1. As shown, there is a steep negative-going transient at point A in FIG. 2b. The capacitances in the secondary circuit generally suffice to damp out most of the radio frequency oscillations appearing in the primary. The next principal characteristic of the secondary waveform is an audio frequency portion appearing between points B and C in FIG. 2b, 180° out of phase with the primary voltage.

Figure 2:
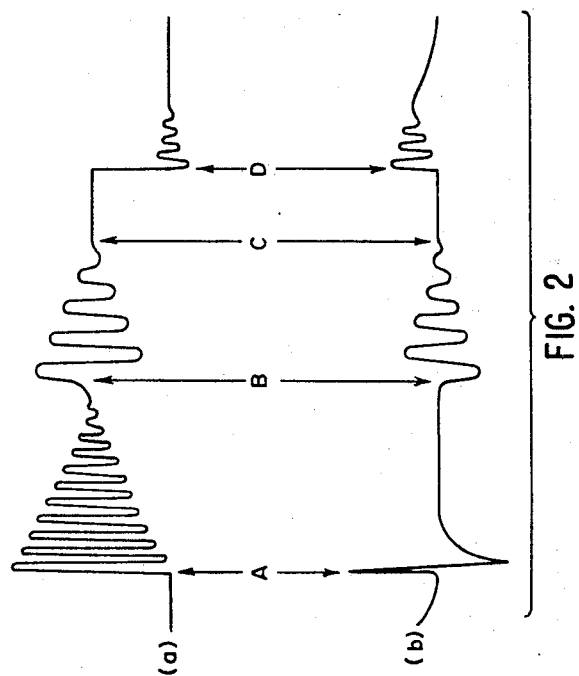

As will appear, the time between the points A and B in FIG. 2 is taken as a measure of the spark duration. Apparatus for making this measurement will next be described rather generally in connection with FIG. 3.

Figure 3:
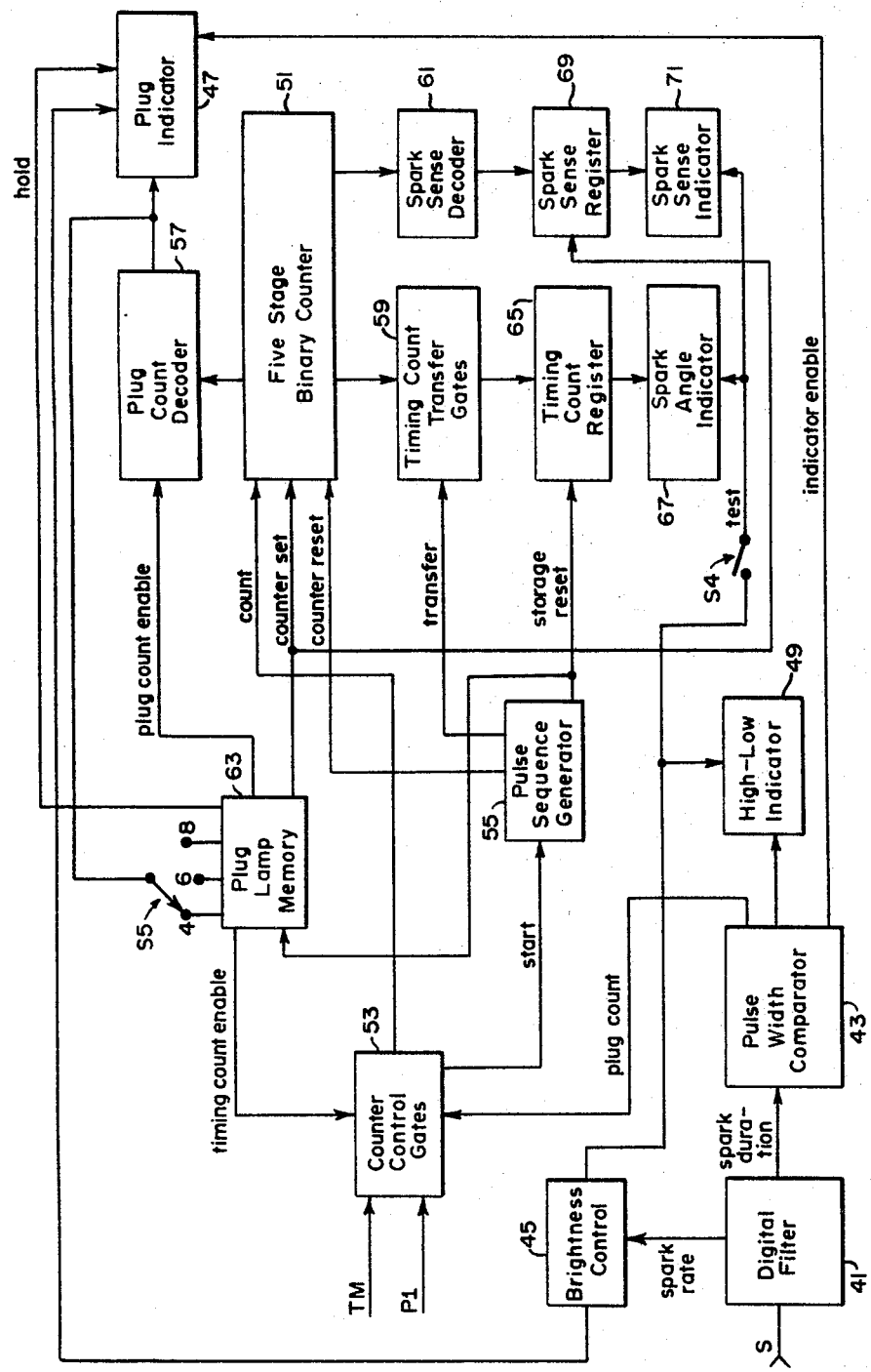
FIG. 3 is a functional block diagram showing a portion of the apparatus of FIG. 1 in somewhat more detail.

As shown in FIG. 3, the signal S is applied to a digital filter 41. The digital filter 41 produces a spark duration signal comprising a positive and a negative square pulse each equal in duration to the period between points A and B in FIG. 2. This spark duration signal is supplied to a pulse width comparator 43.

The digital filter 41 also provides a spark rate signal in the form of a pulse of predetermined duration for each plug that is fired. This spark rate signal is applied to a brightness control unit 45.

In a manner that will appear, the brightness control 45 controls the voltage applied to a plug indicator 47, and a HIGH-LOW indicator 49. The plug indicator 47 comprises the plug indicator lamps KP1 through KP8 in FIG. 1. The indicator 49 comprises the lamps KH and KL in FIG. 1. In the TEST position of the switch S4, the brightness control level is also supplied to a spark angle indicator 67, comprising the lamps K0 through K30 in FIG. 1, and to a spark sense indicator 71, comprising the lamps KA and KB in FIG. 1.

The purpose of the brightness control is to supply more current to the indicator lamps when the engine is running at high speed than when it is running at low speed, to cause the effective brightness of the indications to be relatively constant as the speed of the engine changes.

The pulse width comparator 43 controls the indicator 49, provides an INDICATOR ENABLE signal for the plug indicator 47, and supplies a PLUG COUNT signal. The PLUG COUNT signal comprises a pulse for each spark plug that is fired. Those pulses are used to determine which plug is firing, and also for wave-shaping purposes.

The PLUG COUNT pulses are each square pulses of a predetermined duration equal to the adjusted duration of the HIGH pulse. During a firing cycle, the PLUG COUNT pulses are used to step a five-stage binary counter 51 under the control of a set of counter control gates 53.

The counter control gates 53 receive, in addition to the plug count pulses, the pulse P1 produced when the first plug in the sequence fires, the timing pulses TM, and a TIMING COUNT ENABLE signal.

When the pulse P1 is produced, it is combined with a PLUG COUNT pulse in the gates 53 to produce a START signal that is applied to a pulse sequence generator 55. The pulse sequence generator 55, in response to the START signal, produces in sequence a STORAGE RESET pulse, a TRANSFER pulse, and a COUNTER RESET pulse. The function of these pulses will be described below.

A binary counter 51 has output terminals connected to a plug count decoder 57, timing count transfer gates 59, and a spark sense decoder 61. The plug count decoder 57 operates in response to the contents of the counter 51 to reset a plug lamp memory 63 when a count in the counter is reached that indicates that the last plug has been fired. The corresponding count is selected by the switch 55, depending on whether a four, six or eight cylinder engine is being monitored. Until this count is reached, the plug lamp memory 63 supplies a PLUG COUNT ENABLE signal to the plug count decoder 57. While the PLUG COUNT ENABLE level is present, the decoder 57 supplies signals to the plug indicator 47 indicating which plug is firing.

When the plug count decoder 57 resets the plug lamp memory 63 as the last plug is fired, the lamp memory 63 produces a TIMING COUNT ENABLE signal to allow the timing pulses TM to be passed through the counter control gates 53 to the counter 51. The counter 51 then stores as many timing pulses as may occur until the first plug fires and produces a signal P1. At that time, a START signal is produced by the gates 53 and the pulse sequence generator operates, first, to produce the STORAGE RESET pulse.

The STORAGE RESET pulse sets the plug lamp memory 63 to remove the TIMING COUNT ENABLE level. The STORAGE RESET pulse also clears a timing count register 65.

The pulse sequence generator 55 then produces a TRANSFER pulse enabling the gates 59 to deposit the contents of the counter 51 in the timing count register 65. The contents of the timing count register are applied to the spark angle indicator 67, comprising the sixteen indicating lamps K0 through K30 shown in FIG. 1, and their control circuits, to be described.

During the timing count, if the first plug does not fire before a predetermined count is received, a spark sense decoder 61 will set a spark sense register 69. The spark sense register 69 controls a spark sense indicator 71, comprising the lamps KA and KB in FIG. 1, and their control circuits, to be described. As will appear, firing normally occurs before top dead center, so that the circuits are arranged to illuminate the lamp KB in FIG. 1 normally and to illuminate the lamp KA only if firing occurs after top dead center.

After the transfer of the timing count to the timing count register 65, the pulse sequence generator 55 produces a COUNTER RESET pulse to set the counter 51 to a reference state corresponding to count 1 for plug 1. The plug lamp memory 63 is set by the STORAGE RESET pulse to remove the TIMING COUNT ENABLE level and produce the PLUG COUNT ENABLE level.

Each PLUG COUNT signal produced after the first plug is fired to produce the START signal will be gated to the counter 51. When the last cylinder fires, the plug lamp memory 63 will be reset to produce the TIMING COUNT ENABLE signal and a COUNTER SET signal.

The COUNTER SET signal sets the counter 51 to a predetermined count, from which timing counting proceeds. The COUNTER SET pulse also sets the spark sense register 69 to its normal state in which the spark sense indicator 71 indicates that firing is before top dead center.

Having described the general organization and mode of operation of the apparatus of my invention, the details of a preferred embodiment will next be described.

Certain logical conventions will be used in the description. First, the truth value of logic 1 will be taken to be a positive voltage with respect to ground, sometimes referred to as "HIGH." A logic 0 value will be taken as voltage that is at ground potential or below ground potential, sometimes referred to as "LOW." In FIG. 3, the signals are labelled without reference to these conventions. However, the signals shown in FIG. 4 and in the following figures are labelled to indicate the logical condition prevailing when the leads on which the signals appear are positive with respective to ground. In other words, for example, the label "$\overline{\text{LOW}}$" on a lead means that when the logical condition LOW is present, the lead is at ground potential.

Figure 4:
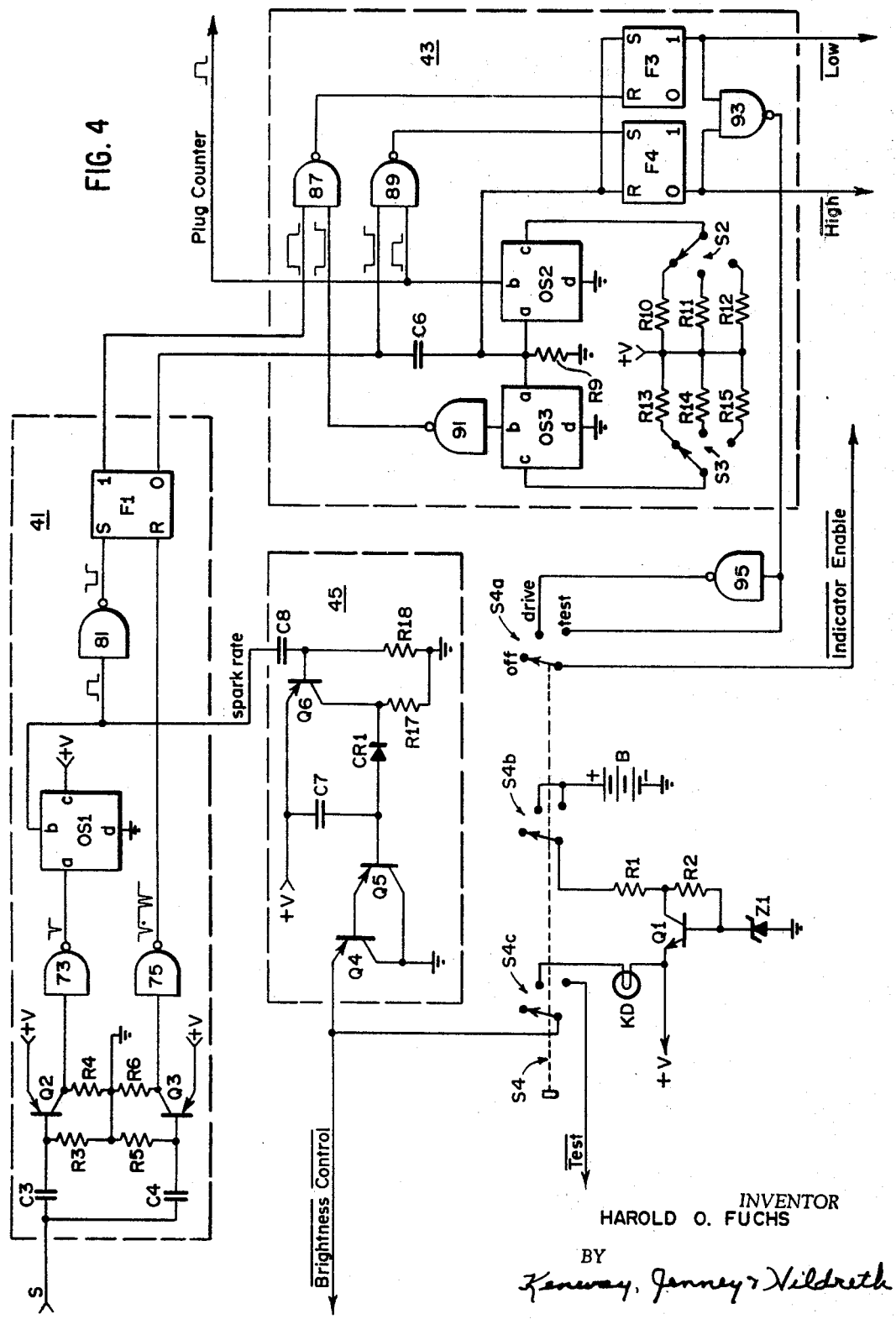
FIG. 4 is a wiring diagram of a power supply, digital filter, and pulse width comparator forming a portion of the apparatus of FIG. 3.

FIG. 4 shows the construction of the digital filter 41, brightness control 45, pulse width comparator 43, and regulated power supply. Of these components, the power supply will first be described.

Power supply regulation is desirable in order to ensure the proper operation of certain of the circuits of my invention that might be affected by fluctuations in the battery supply voltage. The battery B, normally supplying 12 volts, can under certain circumstances supply from 10 volts to over 14 volts, depending on the condition of the battery, the load and the generator or alternator. In particular, the pulse width comparison circuits of the apparatus of my invention require constant supply voltage.

As shown in FIG. 4, the switch S4 comprises three decks S4a, S4b and S4c. Positive voltage from the battery B is supplied to the apparatus of my invention over the switch deck S4b in the DRIVE and TEST positions of the switch. In those positions, the circuit extends from the positive terminal of the battery B, over the terminals of the switch S4b, through a resistor R1, through a resistor R2, and through a Zener diode Z1 biased in the reverse direction to ground.

The collector of an npn power transistor Q1 is connected to the junction of the resistors R1 and R2, and the base of the transistor Q1 is connected to the junction of the resistor R2 and the diode Z1. The transistor Q1 may be an npn type 2N1701 power transistor, the resistor R1 may be 10 watts, 5 ohms, the resistor R21 may be 33 ohms, and the breakdown voltage of the Zener diode Z1 may be 6.8 volts. With these components, the voltage +V assumed by the emitter of the transistor Q1 will be 6.1 volts.

The transistor Q1 acts as an emitter follower, with the control and indication circuits of the apparatus to be described as the load. As the load varies, the Zener diode Z1 draws more or less current to maintain the base voltage of the transistor at 6.8 volts, and the voltage at the emitter will remain within plus or minus 0.1 volt of 6.1 volts. The voltage labelled +V at the emitter of the transistor Q1 is the supply voltage shown in many other places in the drawings to be described.

The digital filter 41 comprises two pnp transistors Q2 and Q3 each having its emitter connected to the supply terminal at +V. The base of the transistor Q2 is connected to the terminal on which the signal S appears through a capacitor C3, and the base of the transistor Q3 is connected to the same terminal through a capacitor C4. The base and collector of the transistor Q2 are returned to ground through two resistors R3 and R4, respectively. Similarly, the base and collector of the transistor Q3 are returned to ground through two resistors R5 and R6, respectively.

The components associated with the transistor Q2 are selected to bias it so that it will be caused to conduct only by the steep negative transient occurring at point A in FIG. 2. The corresponding components associated with the transistor Q3 are selected to allow it to respond not only to that transient, but also to the negative-going transients corresponding to the low frequency cycles beginning at point B in FIG. 2.

As a specific example, the resistor R3 may have a resistance of one megohm, the resistor R4 may have a resistance of 68 ohms, and the capacitor C3 may have a capacitance of .005 microfarad. With those values, the transistor Q2 would be normally biased nonconducting, and would conduct and produce a positive 6 volt pulse at its collector only in response to the steep negative transient occurring at A in FIG. 2.

The resistors R5 and R6 may have resistances of 150,000 ohms and 100 ohms, respectively, and the capacitor C4 may have a capacitance of .01 microfarad. With these components, the transistor Q3 will conduct and produce a substantially 6 volt pulse at its collector both at the negative-going transient at point A in FIG. 2 and at the first and perhaps the second negative-going audio frequency transient between points B and C in FIG. 2. The collector of the transistor Q2 may go slightly positive in response to these latter pulses, but not sufficiently to affect the following circuits.

The collector of the transistor Q2 is connected to an input terminal of a conventional NAND gate 73. This gate, as well as other gates to be described and shown by the same symbol, may be of the conventional variety which responds to a ground level or negative voltage applied to any input terminal to produce a positive voltage at its output terminal, and responds to a positive voltage or an open circuit at all input terminals to produce a ground level output voltage. In the drawings, ground returns for the gates are not shown; they may be assumed to be within the gate symbol.

As only one active input terminal of the gate 73 is used, it acts as an inverter to produce a ground level output pulse when the collector of the transistor Q2 goes sufficiently positive. With the biasing arrangements described, that will occur only in response to the sharp negative transient occurring at the beginning of each spark pulse.

The collector of the transistor Q3 is connected to the input terminal of a NAND gate 75. This gate will produce at least two negative output pulses in response to each spark pulse, one occurring simultaneously with the pulse from the gate 73, and the other occurring at the point B in FIG. 2. Any additional pulses produced by the gate 75 between the points B and C in FIG. 2 will have no effect on the system.

The output terminal of the gate 73 is connected to the input terminal $a$ of a one-shot multivibrator OS1. This multivibrator, as well as other one-shot multivibrators to be described, may be of the type shown in detail in FIG. 5.

Referring to FIG. 5, the multivibrator OS1 may comprise a pair of NAND gates 77 and 79. The gate 77 is provided with two active input terminals and the gate 79 is provided with one active input terminal.

One input terminal of the gate 77 is connected to input terminal $a$ of the multivibrator. The second input terminal of the gate 77 is connected to the output terminal of the gate 79 through a capacitor C5. The output terminal of the gate 77 is connected to the output terminal $b$ of the multivibrator, and to the input terminal of the gate 79.

A positive voltage, here shown as the power supply voltage +V, is connected between a supply terminal $c$ of the multivibrator and a ground terminal $d$. Between terminals $c$ and $d$ are connected a potential divider comprising a pair of resistors R7 and R8 in series. The junction of these resistors is connected to the junction of the capacitor C5 and the input terminal of the gate 77.

With the connections shown, when no input signal is applied to input terminal $a$ of the multivibrator, the positive potential at the junction of the resistors R7 and R8 will force the output of the gate 77 to logic 0, thereby forcing the output terminal of gate 79 to logic 1 or a positive 6 volts with respect to ground. A positive voltage applied to the input terminal $a$ will not change this state of the apparatus. However, when a negative potential or a ground level potential is applied between input terminal $a$ and ground, the output of the gate 77 will be forced high, causing the output of the gate 79 to go towards ground and applying the negative voltage now appearing across the capacitor C5 to the gate 77. Although the brief negative pulse supplied to input terminal $a$ may have been removed, the state of the apparatus will be maintained with the output terminal of the gate 77 high until the capacitor C5 can charge through the resistor R7 to a positive voltage high enouugh to be accepted by the gate 77 as a logic 1 input, driving the output low. A square positive pulse will thereby be produced at the output terminal $b$ of the multivibrator, having a time constant dependent on the values of the capacitor C5 and the resistor R7. As will appear, additional resistors may be connected between the terminal $c$ of the multivibrator and the supply voltage terminal at +V to increase this time constant if desired.

Returning to FIG. 4, the output of the one-shot multivibrator OS1 is inverted by a NAND gate 81 and applied to the set input terminal of the flip-flop F1. The reset terminal of the flip-flop F1 receives the negative pulses from the gate 75.

Figure 6:
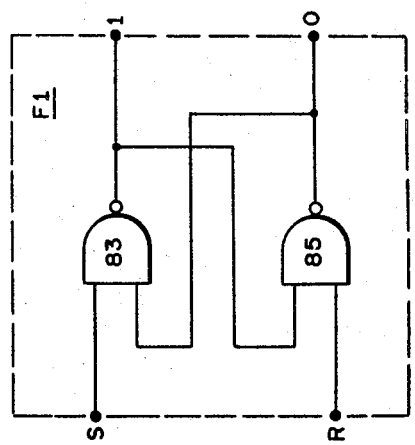
FIG. 6 is a schematic diagram of a flip-flop suitable for use in the apparatus of FIG. 4.

The flip-flop F1 may be a DC flip-flop of any conventional variety, but is preferably of the form shown in FIG. 6. Referring to FIG. 6, such a flip-flop may simply comprise two NAND gates 83 and 85 cross-coupled as shown. Each of the gates 83 and 85 may have two active input terminals.

The set terminal S of the flip-flop is connected to one input terminal of the gate 83, and the output terminal of the gate 85 is connected to the second input terminal of the gate 83. The reset input terminal R of the flip-flop is connected to one input terminal of the gate 85, and the output terminal of the gate 83 is connected to the other input terminal.

The output terminals of the gates comprise the logic 1 and logic 0 output terminals of the flip-flop. It will be apparent that when a positive voltage or no voltage is applied to reset terminal R, and a negative voltage is applied to the input terminal S, the logic 1 output terminal of the flip-flop will be set to a positive voltage. At the same time, the logic 0 output terminal will be driven to ground potential by the positive voltage applied to the input terminal of the gate 85. If positive input signals are applied to both the set and reset input terminals, the state of the flip-flop will not change. If negative signals are applied to both input terminals of the flip-flop, both the logic 1 and logic 0 terminals will be driven to logic 1. Under these circumstances, the flip-flop will then be changed to the state directed by the negative signal remaining after one of them has been removed.

Turning to FIG. 4, if the gatesc 73 and 75 produce first output pulses at the beginning of a spark interval, initially negative pulses will be applied to both the set and reset terminals of the flip-flop F1. However, the pulse applied to the set input terminal has been stretched by the multivibrator OS1, and accordingly is the last to remain, causing the flip-flop F1 to be set. The second output pulse produced by the gate 75, at the beginning of the audio frequency portion of the spark cycle, will reset the flip-flop F1. There will thereby be produced at its logic 1 output terminal a square positive pulse having a duration equal to the spark duration, and at its logic 0 terminal a ground level pulse having the same duration. These pulses are applied to the input terminals of the pulse width comparator 43, next to be described.

The logic 0 output terminal of the flip-flop F1 is connected to ground through a capacitor C6 in series with a resistor R9. The junction of the capacitor C6 and the resistor R9 is connected to the input terminals $a$ of a pair of one-shot multivibrators OS2 and OS3, which may be of the same construction as the multivibrator OS1 described above. These multivibrators will be triggered by the leading edge of the negative square pulse produced by the flip-flop F1.

The junction of the capacitor C6 and the resistor R9 is also connected to the set terminal of a flip-flop F3 and to the reset terminal of a flip-flop F4. These flip-flops may be of the construction described for the flip-flop F1. With this arrangement, at the leading edge of each spark time duration pulse produced by the flip-flop F1, the flip-flop F3 will go to its set state and the flip-flop F4 will go to its reset state.

The time constant of the multivibrator OS2 is controlled by the switch S2 which determines which of a set of resistors here shown as a set R10, R11 and R12 is connected between the supply terminal $c$ of the multivibrator and the supply voltage terminal at +V. In practice, I prefer to provide ten positions for the switch S2 and ten corresponding resistors such as the resistor R10 to select an output pulse width from the multivibrator OS2 of from 600 to 1500 microseconds. The reason is that the shortest spark pulse that is acceptable is determined both by the engine and by the speed at which it is run. There will thereby be produced at the output terminal $b$ of the multivibrator OS2 a positive pulse that is shorter in duration than the shortest desirable spark pulse.

Similarly, the multivibrator OS3 has a time constant controlled by the switch S3 that selects one of a set of resistors, here shown as a set R13, R14 and R15, to determine its time constant. Preferably, I also provide ten of these resistors, and a ten-position switch S3, so that a pulse output pulse having a duration of 1000 to 2000 microseconds can be provided by the multivibrator OS3.

The logic 1 output terminal of the flip-flop F1 is connected directly to one input terminal of a NAND gate 87, and the logic 0 output terminal of the flip-flop F1 is connected to one input terminal of a NAND gate 89. The output terminal $b$ of the multivibrator OS2 is connected directly to the second input terminal of the gate 89. The output terminal $b$ of the multivibrator OS3 is connected through an inverting NAND gate 91 to the second input terminal of the gate 87.

Considering first the gate 87, at substantially the same time that the logic 1 output terminal of the flip-flop F1 goes positive, the output terminal of the gate 91 will go negative and hold the output of the gate 87 high. The pulse at the logic 1 output terminal of the flip-flop F1 should terminate before the output of the gate 91 again goes high. If that occurs, then the output of the gate 87 will remain high and not affect the operation of the system. However, if the pulse from the flip-flop F1 is longer than it should be, the gate 87 will produce a negative output pulse and reset the flip-flop F3.

The logic 1 terminal of the flip-flop F3 is used to produce a signal labelled $\overline{\text{LOW}}$. In the state to which this flip-flop is initially set, the voltage at this terminal would be positive, so that the indication will be "not LOW." Should the gate 87 produce a negative output pulse indicating that the spark duration is too long, the flip-flop F3 will be reset and a 0 voltage LOW signal will be produced.

Considering next the gate 89, substantially at the time the voltage at the logic 0 output terminal of the flip-flop F1 goes low, the voltage at the output terminal of the multivibrator OS2 will go high. The low input will hold the output of the gate 89 high. If the spark duration is normal, the output of the multivibrator OS2 will again go low before the logic 0 output terminal of the flip-flop F1 goes high. That will maintain the voltage at the output of the gate 89 high. However, should the spark duration pulse be too short, both input terminals of the gate 89 will go high and cause the flip-flop F4 to be set, producing the 0 voltage level HIGH.

The logic 0 output terminal of the flip-flop F4 and the logic 1 output terminal of the flip-flop F3 are connected to the input terminals of a NAND gate 93. The function performed by the gate 93 depends on the position of the deck S4a of the switch S4.

In the TEST position, when the spark duration is normal, the ground level produced by the gate 93 is applied through a resistor R16 to supply an INDICATOR ENABLE signal to the indicator circuits to be described below. That signal will cause the lights to be lit for each plug indicator lamp that is firing normally. If a plug does not fire normally in the sequence, the positive signal INDICATOR ENABLE will be produced and the corresponding lamp will not be lit.

In the DRIVE position of the switch S4, to reduce the amount of blinking lights that might distract the operator, the output of the gate 93 is inverted by a gate 95 so that the indicators will be enabled only when a defective firing occurs. In the OFF position in which the switch S4 is shown, the output of the comparator is not applied to the indicator lights.

The output pulses from the multivibrator OS1 are also applied to the brightness control unit 45 as the SPARK RATE signal. The brightness control acts to proportionally increase the voltage to the indicator lamps as the engine r.p.m. is increased. For this purpose, as will appear, the lead labelled BRIGHTNESS CONTROL serves as a ground return for the indicator lamps to which it is connected. As shown, it returns to ground through the emitter-to-collector path of a transistor Q4.

The transistor Q4 is of the pnp type, and has its collector grounded as shown. The base of the transistor Q4 is connected to the emitter of a second pnp transistor Q5, that also has a grounded collector.

The base of the transistor Q5 is connected to the junction of a capacitor C7 and a diode CR1. The other terminal of the capacitor C7 is connected to the emitter of a pnp transistor Q6, and to the supply terminal at +V.

The cathode of the diode CR1 is connected to the collector of the transistor Q6, and is returned to ground through a resistor R17. The base of the transistor Q6 is returned to ground through the resistor R18. The base of the transistor Q6 is also connected to the output terminal b of the multivibrator OS1 through a capacitor C8.

The resistor R18 is selected to cause the transistor Q6 to be slightly forward-biased so that the voltage at its collector will rise and block the diode CR1. The capacitor C7 will then discharge through the base of the transistor Q5, tending to bias the transistor Q5 slightly into conduction. The low emitter current drawn by the transistor Q5 causes the transistor Q4 to be slightly biased into conduction, producing a relatively high resistance path between the emitter and collector that limits the current in the lamp circuits, to be described, so that they will glow at a normal brightness.

Each time a pulse is produced by the multivibrator OS1, the transistor Q6 will be cut off for the duration of the positive pulse. That will cause the diode CR1 to be forward-biased, drawing current to charge the capacitor C7 and pull the base of the transistor Q5 more negative. The emitter of the transistor Q5 will thereby draw more current through the base of the transistor Q4, causing the transistor Q4 to be more conducting and present less resistance to the lamp circuit. The magnitude of this effect will depend on the rate at which the pulses are produced by the multivibrator OS1, and is consequently determined directly by the speed of operation of the engine.

The deck S4c of the switch S4 provides a return for a pilot light KD in the DRIVE position of the switch, serving as a panel indicator that the switch is in that position. In the TEST position of the switch, the brightness control return line is connected to the timing indicator lamps. To distinguish this signal logically from the BRIGHTNESS CONTROL signal, it has been labelled TEST. However, it is manifestly at the same level as the brightness control signal in the TEST position of the switch.

Figure 7:
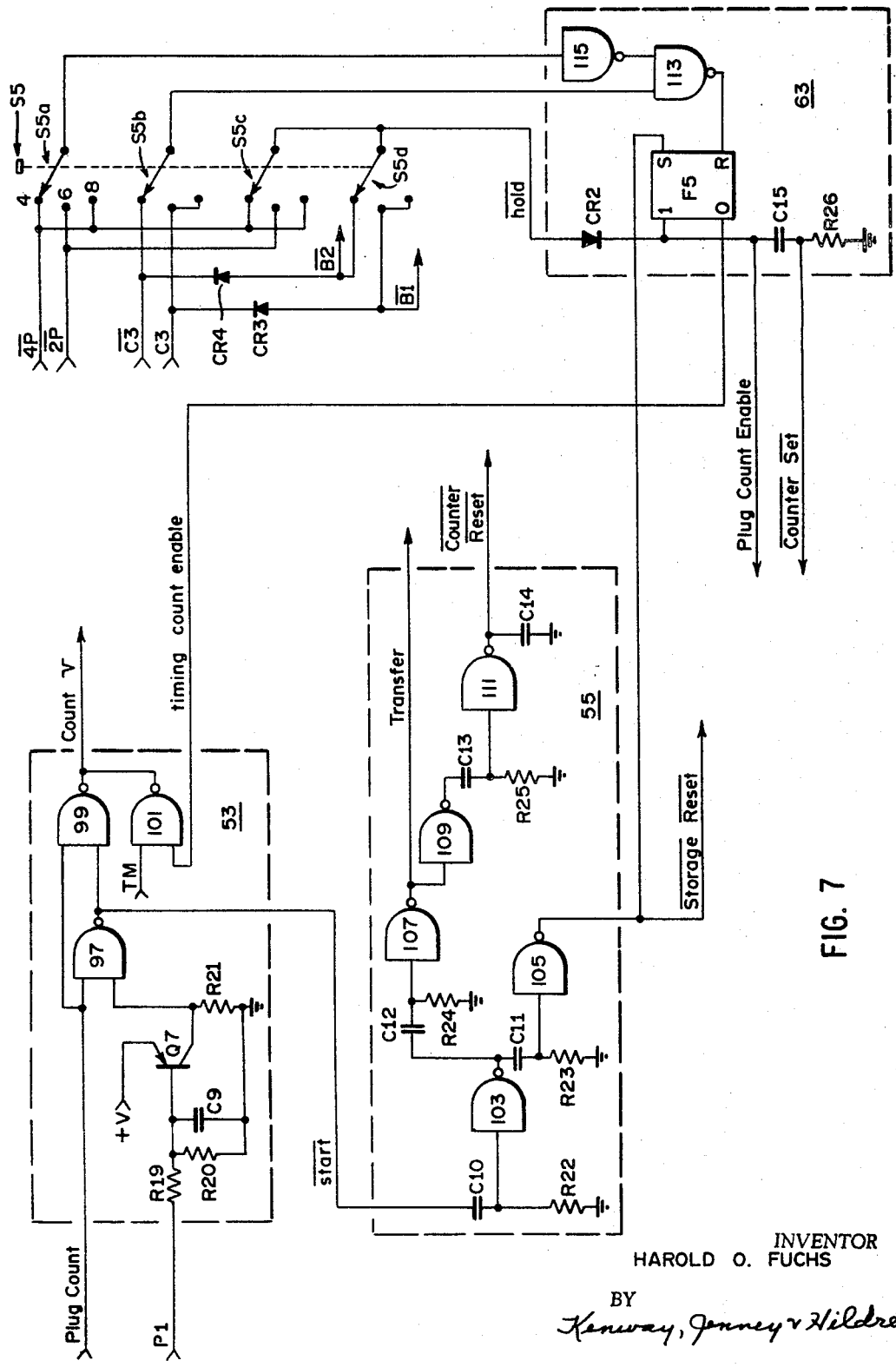
FIG. 7 is a schematic wiring diagram of counter control gates, a pulse sequence generator, and a plug lamp memory forming a portion of the apparatus of FIG. 3.

FIG. 7 shows the details of the counter control gates 53, the pulse sequence generator 55, and the plug lamp memory 63. The counter control gates 53 will first be described.

The lead 17 in FIG. 1, on which a pulse P1 appears each time the first plug 15 is fired, is shown returned to ground in FIG. 7 through a potential divider comprising two resistors R19 and R20 in series. A capacitor C9 is connected in parallel with the resistor R20. The junction of the resistors R19 and R20 is connected to the base of a pnp transistor Q7. The emitter of the transistor Q7 receives a supply voltage +V, and the collector is returned to ground through a resistor R21.

In order to avoid loading the ignition circuit for the plug 15, the resistors R19 and R20 are made large. For example, the resistor R19 may be a 100 megohm resistor, and the resistor R20 may be a 10 megohm resistor. The capacitor C9 may, for example, have a capacitance .01 microfarad. The other components are not critical.

At the time when the plug 1 fires, a negative-going transient will gate the transistor Q7 into conduction, causing a positive pulse to appear across the resistor R21. The capacitor C9 will bypass the radio frequency components in the signal induced on the lead 17. It will also delay the decay of the negative voltage at the base of the transistor Q7, causing the output of the transistor Q7 appearing on its collector to be a rather slowly rising and decaying positive pulse. This pulse is applied to one input terminal of a NAND gate 97. A second input terminal of the gate 97 receives the regulated positive PLUG COUNT pulses from the multivibrator OS2 in FIG. 4. By that arrangement, each time the first plug fires, the gate 97 will produce a ground level pulse of regulated duration. This pulse comprises the START signal applied to the pulse generating circuits 55.

In the absence of pulses P1, the transistor Q7 is cut off and the gate 97 is inhibited. Its output terminal is then at a positive potential with respect to ground. This output terminal is connected to one input terminal of a NAND gate 99. A second input terminal of the gate 99 is connected to receive the PLUG COUNT pulses. By that arrangement, the gate 99 produces a ground level COUNT pulse at each PLUG COUNT pulse produced except the one that is produced when the first plug fires.

During the timing count cycle of operation, COUNT pulses are produced by a NAND gate 101. This gate receives the timing mark pulses TM and a TIMING COUNT ENABLE level from the plug lamp memory 63.

Considering next the pulse generating circuits 55, the lead labelled START is returned to ground through a capacitor C10 in series with a resistor R22. The junction of the capacitor C10 and the resistor R22 is connected to an inverter comprising a NAND gate 103. The negative-going leading edge of the start pulse is differentiated by the capacitor C10 and the resistor R22 to provide a negative differentiated spike slightly over 100 microseconds wide for application to the gate 103. For this purpose, the value of the capacitor C10 may be one-tenth microfarad, and of the resistor R22, 33,000 ohms.

The output of the gate 103 is a positive square wave approximately 100 microseconds wide. This output signal is differentiated by a first timing circuit comprising a capacitor C11 and a resistor R23 to produce a positive differentiated spike across the resistor R23. This signal is appplied to an inverter comprising a NAND gate 105.

The value of the resistor R23 is selected to keep the input of the gate 105 normally low, so that the output is positive. When the positive differentiated spike is applied, the gate 105 produces a negative-going square wave approximately 25 microseconds wide to comprise the STORAGE RESET pulse. The value of the capacitor C11 may be .01 microfarad, and the value of the resistor R23 may be 680 ohms.

A second differentiator comprising a capacitor C12 and a resistor R24 is connected between the output terminal of the gate 103 and ground. The value of the capacitor C12 may be .01 microfarad, and the value of the resistor R24 may be 4700 ohms.

The junction of the resistor R24 and the capacitor C12 is connected to an inverter comprising a NAND gate 107. The resistor R24 is selected to be large enough to keep the input terminal of the gate 107 normally high, causing its output terminal to be normally at ground potential. At the trailing edge of the positive-going pulse produced by the gate 103, the input terminal of the gate 107 is driven negative, causing a positive TRANSFER pulse to be produced by the gate 107 of approximately 25 microseconds in width. This pulse occurs approximately 27 microseconds after the negative STORAGE RESET pulse.

The TRANSFER pulse is applied to an inverter 109 comprising a NAND gate, to produce a negative-going 25 microsecond pulse at its output terminal. That pulse is differentiated by a capacitor C13 in series with a resistor R25 connected between the output terminal of the gate 109 and ground.

The capacitor C13 may be .005 microfarad, and the resistor R24 may be 680 ohms. The junction of the resistor R24 and the capacitor C13 is connected to an inverter comprising a NAND gate 111.

The resistor R24 is selected to be small enough to keep the input terminal of the gate 111 normally low, causing its output to be normally high. At the trailing edge of the negative pulse produced by the gate 109, the positive-going spike produces a negative-going COUNTER RESET output pulse from the gate 111 of approximately 10 microseconds in width.

A capacitor C14 between the output terminal of the gate 111 and ground delays the output for two or three microseconds. Thus, the 10 microsecond COUNTER RESET pulse occurs slightly after the end of the TRANSFER pulse. For that purpose, the capacitor C5 may have a capacitance of about .005 microfarad.

The plug lamp memory 63 will next be described. This unit comprises a flip-flop F5 which may be of the same construction as those previously discussed. The reset terminal of the flip-flop F5 is connected to the output of a NAND gate 113. The gate 113 has one input terminal connected to the output terminal of another NAND gate 115.

The gates 113 and 115 are arranged to reset the flip-flop F5 at a predetermined count representing the last plug in a firing sequence. That would be the fourth plug in a four cylinder engine, the sixth plug in a six cylinder engine and the eighth plug in an eight cylinder engine.

The selection of the proper count is made by the switch S5. This switch has four decks, S5a, S5b, S5c and S5d. Each deck comprises a three position switch. The armature of the deck S5a is connected to the input terminal of the gate 115, and the armature of the deck S5b is connected to the input terminal of the gate 113. The switch S5 is shown set in the position proper for a four cylinder engine. In that position, the gate 115 receives the signal 4P produced in a manner to be described as a ground level signal when the counter reaches the fourth count. The gate 113 receives the signal $\overline{C3}$ in the position shown. As will appear, at the fourth count of the counter that signal will be positive. Under those conditions, the output of the gate 115 will be high and the output of the gate 113 will be low, resetting the flip-flop F5.

In the second, or six cylinder, position of the switch S5, the gates 115 and 113 will receive the signals $\overline{2P}$ and C3, respectively. As will appear, these signals will be respectively at ground level and at a positive level when the sixth count is reached.

In the third position of the switch, for an eight cylinder engine, the gate 115 will again receive the signal $\overline{4P}$ and the gate 113 will receive the signal C3. In this position of the switch, the gate 115 will receive a logic 0 signal and the gate 113 will receive a logic 1 signal from the switch when the eighth plug fires.

The flip-flop F5 is set by the negative STORAGE RESET pulse produced by the gate 105 following each START signal produced when the first plug is fired. The STORAGE RESET pulse sets the flip-flop to its logic 1 state, in which the level PLUG COUNT ENABLE is produced at its logic 1 terminal and the TIMING COUNT ENABLE signal is removed from its logic 0 terminal, when the latter goes to ground potential.

When the last count is reached and the flip-flop F5 is reset, to begin a timing count, it is desired to set the counter 51 in FIG. 3 to a predetermined count. For that purpose, referring again to FIG. 7, a capacitor C15 and a resistor R25 are connected in series between the logic 1 terminal of the flip-flop F5 and ground. The capacitor C15 may have a capacitance of .005 microfarad, and the resistor R25 may have a resistance of 33,000 ohms. When the flip-flop F5 is reset, as its logic 1 terminal goes negative, a COUNTER SET negative pulse will be produced across the resistor R25 to set the counter in a manner to be described.

When the last plug in a sequence is fired, and the counter is set to a predetermined count in the manner just described, the lamp indicating that the last plug was firing would be extinguished by the changed count in the counter if no provision was made to hold it. In order to hold the indication while the timing count is made, the logic 1 terminal of the flip-flop F5 is connected through a diode CR2 to the armatures of decks S5c and S5d of the switch S5. In the four and eight cylinder positions of the switch S5, with the flip-flop F5 in its reset state, a ground level is applied to the lead on which the label $\overline{4P}$ appears. As will appear, that will maintain that lead at a logic 0 level and thereby hold the indication even though the counter has changed. In the six cylinder position of the switch S5, the armature of the deck S5c similarly holds the lead on which the label $\overline{2P}$ appears at ground potential.

In the four cylinder position of the switch S5, with the flip-flop F5 reset, the armature of the switch S5b produces a ground level signal B2. In the six and eight cylinder positions, a ground level signal B1 is produced. These signals are used to control the plug indicator lamps in a manner that will be described below.

The leads on which the labels $\overline{C3}$ and C3 appear are isolated at the time that the flip-flop F5 is in its reset state by a pair of diodes CR3 and CR4. The necessity for that arrangement will appear in connection with FIG. 8, next to be described.

Figure 8:
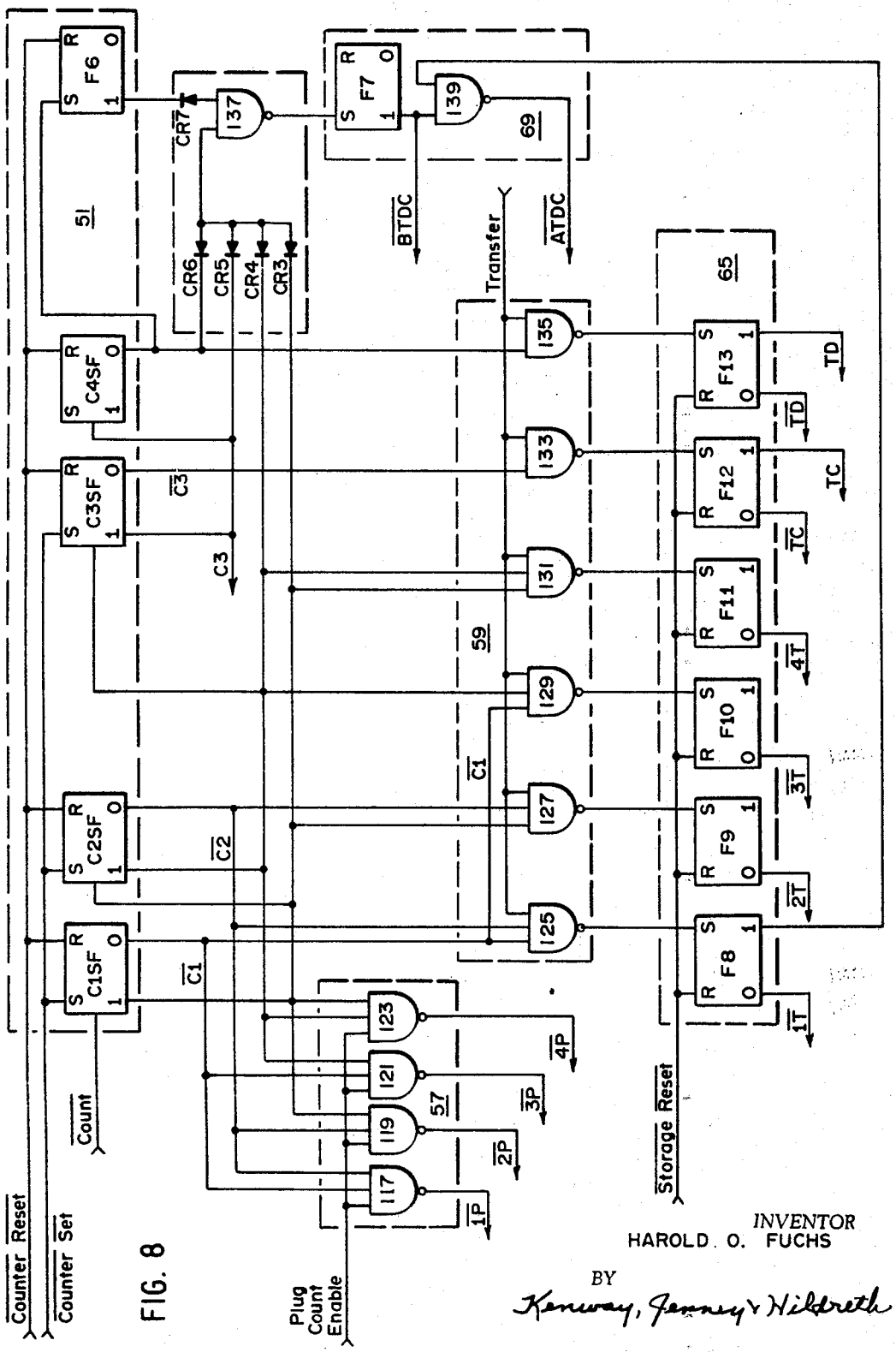
FIG. 8 is a schematic wiring diagram of a binary counter, and various registers and gates forming a portion of the apparatus of FIG. 3.

FIG. 8 shows the binary counter 51, the plug count decoder 57, the timing count transfer gate 59, the timing count register 65, the spark sense decoder 61, and the spark sense register 69.

The counter 51 comprises four stages each consisting of a conventional RS/T flip-flop and a fifth stage consisting of a DC flip-flop such as those previously described. The first four flip-flops C1SF, C2SF C3SF and C4SF may be of the conventional variety that are set by a negative or ground level signal applied to the set terminal S, reset by a negative or ground level signal applied to the input terminal R, and complemented by a negative pulse applied to a clock terminal C.

As a specific example of a suitable flip-flop, the Signetics SP629A integrated circuit may be used. For this purpose, pin 6 would be the set input terminal S, pin 10 would be the reset input terminal R, pins 13 and 14 connected together would comprise the clock input terminal C, the logic 1 output terminal would comprise terminals 12 and 13 connected together, and the logic 0 output terminal would comprise pins 4 and 5 connected together.

The four RS/T flip-flops are connected together as a ripple counter. Specifically, the clock terminal of the first flip-flop C1SF receives the negative COUNT signals. The logic 1 terminal of the flip-flop C1SF is connected to the clock terminal of the flip-flop C2SF. Similarly, the logic 1 output terminal of the flip-flop C2SF is connected to the clock terminal of the flip-flop C3SF and the logic 1 output terminal of the flip-flop C3SF is connected to the clock terminal of the flip-flop CS4F. The flip-flop F6 is connected differently, in that the logic 0 output terminal of the flip-flop C4SF is connected to the set input terminal of the flip-flop F6. Accordingly, the flip-flop F6 will be set at any time that the flip-flop C4SF is set.

Each of the RS/T flip-flops C1SF through C4SF and the flip-flop F6 are connected to be reset by the negative COUNTER RESET pulse. The flip-flops C1SF, C2SF and C3SF are arranged to be set to their logic 1 states by a negative COUNTER SET pulse. When that pulse appears, it will set the first three flip-flops to the 111 state, corresponding to the count that would be reached when the eighth plug was fired in an eight cylinder engine. The purpose for providing this standard setting at the beginning of the timing count is to make it possible to use the same timing angle indicator circuits for four, six and eight cylinder engines.

With the counter connected as described, the first four stages will operate as stages of a conventional ripple counter, but the fifth stage will not. Consider the flip-flop F6 as the highest ordered stage and the flip-flop C1SF as the lowest ordered stage of the modified counter. Assume that all of the flip-flops are reset, to the binary state 00000, reading from right to left in FIG. 8. Assume that COUNT pulses are sequentially applied to the clock terminal of the flip-flop C1SF. Counting will proceed in ascending binary sequence for the first seven pulses from 00000 to 00111, again reading from right to left in FIG. 8 (with the flip-flop F6 reset to 0 and the flip-flop C1SF set to 1). At the eighth pulse, the count will go to 11000, as the setting of the flip-flop C4SF will set the flip-flop F6. Counting will proceed from that point in normal ascending binary sequence from 11001 to 11111, and then to 10000, as the resetting of the flip-flop C4SF will not reset the flip-flop F6. Succeeding pulses would step the counter in binary sequence from 10001 to 11111, and again to 10000. In the normal operation of the circuit shown the highest count reached is 11000, corresponding to the seventeenth timing pulse, following which all flip-flops are reset to 00000 by the COUNTER RESET PULSE.

The plug count decoder 57 comprises four NAND gates 117, 119, 121 and 123. As discussed above in connection with FIG. 7, and as will be described in more detail below, the output terminals of the flip-flop C3SF, on which the signals labelled C3 and $\overline{C3}$ appear, are also used in plug indicating lamp selection; but directly and without decoding.

As shown, each of the gates 117 through 123 has three input terminals, a first of which is connected to receive the positive PLUG COUNT ENABLE level. When this signal is positive, the gates are enabled to decode the outputs of the first two stages of the counter.

As described above, when the first plug fires the counter is reset, so that all of its flip-flops are in their logic 0 states. This state of the counter represents count 1, and in the state the gate 117 produces an output ground level on the lead labelled $\overline{1P}$. When the second plug fires, the gate 119 produces a signal 2P. Similarly, the gate 121 produces a signal 3P when plug 3 fires, and the gate 123 produces a signal 4P when plug four fires.

In an engine having more than four cylinders, when the fifth plug fires, the first three flip-flops in the counter will be in the state 001, reading from left to right, respectively. Under these conditions, the gate 117 will produce the negative signal 1P and the flip-flop C3SF will produce the postive signal C3. Those signals used together will select the fifth plug indicator lamp, in a manner to appear in more detail below. Similarly, for the sixth plug the negative signal 2P and the positive signal C3 will be produced, for the seventh plug the negative signal 3P and the postive signal C3 will be produced, and for the eighth plug the negative signal 4P and the positive signal C3 will be produced.

The timing count transfer gates 59 comprise four three-input terminal NAND gates 125, 127, 129 and 131, and two two-input terminal NAND gates 133 and 135. The gates 125 through 131 translate the outputs of the counter stages C1SF and C2SF. When enabled, the gates 133 and 135 repeat the states of the counters C3SF and C4SF, respectively.

Each of the transfer gates is arranged to set a different one of the six flip-flops comprising the timing count register 65. These flip-flops, labelled successively F8 through F13, may be of the conventional DC variety described above in connection with FIG. 6.

Each of the flip-flops F8 through F13 has its reset terminal connected to receive the STORAGE RESET pulse. When this negative pulse is produced, each flip-flop is set to the state in which its logic 0 output terminal is at logic 1, or a positive voltage with respect to ground. When any of the flip-flops are set, the logic 0 output terminal goes to ground potential and produces the effective enabling signal for certain of the lamp circuits, to be described.

Specifically, when the flip-flops C1SF and C2SF are both reset, and the TRANSFER pulse is produced, the gate 125 sets the flip-flop F8 to place the lead labelled $\overline{1T}$ at ground potential. The gate 127 will similarly set the flip-flop F9 when the flip-flop C1SF is set and the flip-flop C2SF is reset. That will produce a ground potential on the lead labelled $\overline{2T}$. Ground potentials on the leads labelled $\overline{3T}$ and $\overline{4T}$ are similarly produced by the flip-flops F10 and F11 in response to counter states 01 and 11 of the first two stages, respectively.

The flip-flops F12 and F13 are set when the corresponding flip-flops C3SF and C4SF, respectively, are in their reset states when the TRANSFER pulse is produced. Both output terminals of the flip-flops F12 and F13 are used. The flip-flop F12 produces the output signals labelled $\overline{TC}$ and TC, and the flip-flop F13 produces the signals labelled $\overline{TD}$ and TD. These signals are used in combination with the signals $\overline{1T}$ through $\overline{4T}$ to control the selection of the appropriate timing count lamp in a manner to be described.

The spark sense decoder 61 functions to detect the 16th timing pulse occurring during the timing count cycle before the first plug is fired. The effective state of the counter 51 is binary 23 at this time, as the counter is set to binary 7 before the first count. At that count, the flip-flop F6 will be set, the flip-flop C4SF will be reset, and each of the flip-flops C1SF, C2SF and C3SF will be set. That action will block each of a set of five diodes CR3, CR4, CR5, CR6 and CR7, each of which is connected to the output terminal of one of the flip-flops in the counter 51 that will be at a positive potential when the binary 23 is stored in the counter. As shown, the anodes of the diodes CR3 through CR6 are connected together, and their junction is connected to one input terminal of a NAND gate 137.

When all of the diodes are blocked, the gate 137 will produce a low output signal that will set a DC flip-flop F7 comprising the spark sense register 69. The flip-flop F7 is arranged to be reset by the negative-going COUNTER SET pulse used to set the counter 51 to the eighth count.

It will be apparent that the flip-flop F7 will only be set if the maximum timing count of binary 23 is stored, and will normally be in its reset state. The arrangement is preferred because it is quite unusual for an engine to be adjusted so that it will fire at or beyond top dead center, which the maximum timing count represents. Thus, the logic 1 output terminal of the flip-flop F7, connected to the lead labelled $\overline{\text{BTDC}}$ is normally at ground potential indicating that the firing is before top dead center. Should the flip-flop be set, the lamp KB in FIG. 1, indicating "before top dead center," will be extinguished in a manner to be described below.

A high level at the logic 1 output terminal of the flip-flop F7 will be applied to one input terminal of a NAND gate 139, enabling it. What next occurs depends on when the first plug actually fires during the timing count cycle.

If the first plug fires after the 16th count is registered and before the 17th count is registered, both flip-flops C1SF and C2SF will be set when the TRANSFER pulse occurs following the firing of plug 1. That will cause the flip-flop F8 to remain reset. In the reset state, the ground at its logic 1 output terminal will disable the gate 139. Under those conditions, both the lamps KA and KB in FIG. 1 will be extinguished and only the 0 degree indicating lamp K0 will be lit.

If the first plug does not fire before the 17th count is reached, that count will cause the flip-flops C1SF and C2SF to be reset. The following TRANSFER pulse will then set the flip-flop F8, enabling the gate 139 to produce a low at its output terminal and cause the "after top dead center" indicating lamp KA to be lit.

Figure 9:
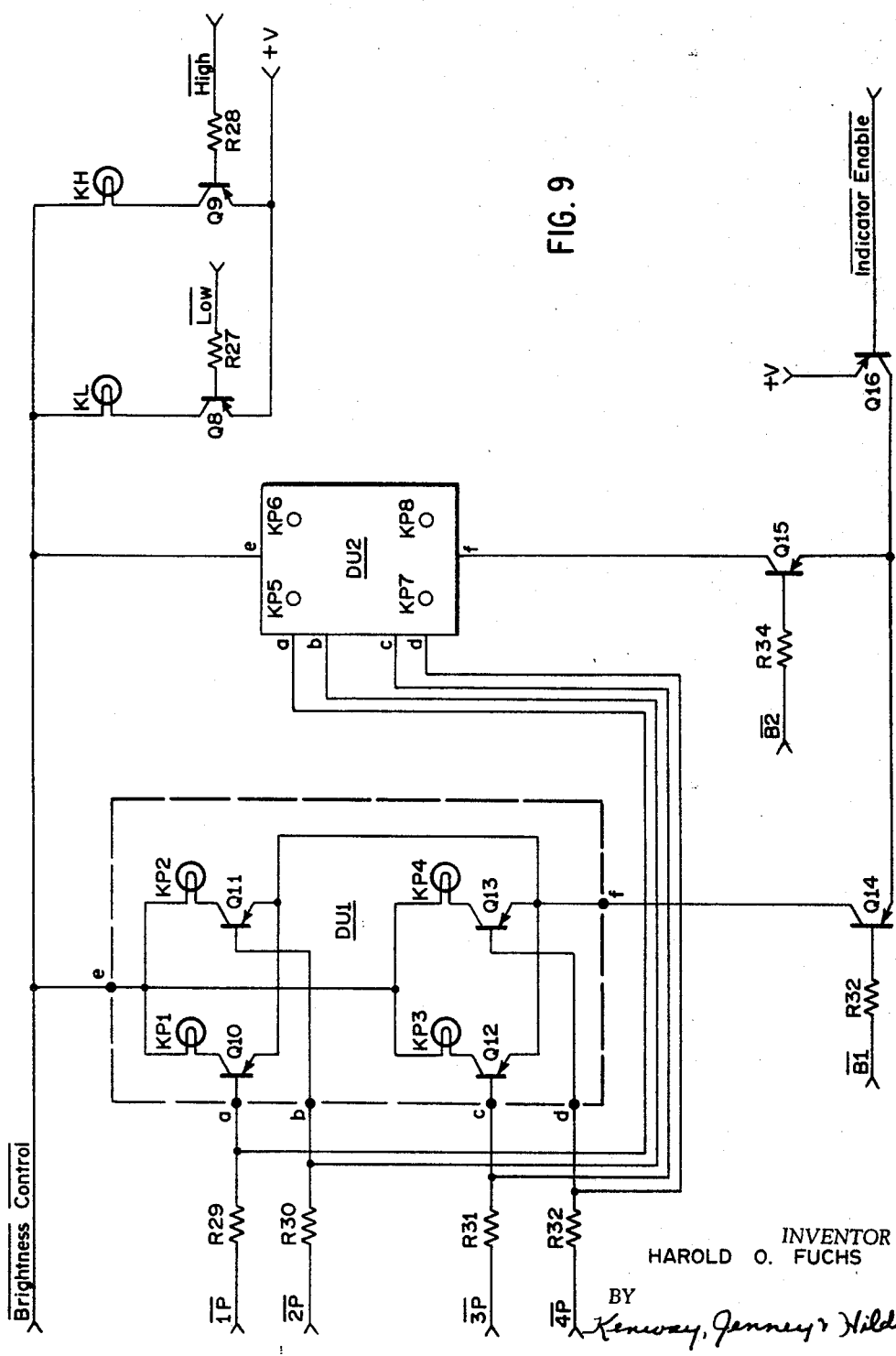
FIG. 9 is a schematic wiring diagram of a plug location and performance indicator forming a part of the apparatus of FIG. 3.

FIG. 9 shows the lamp control circuits for the plug indicating lamps KP1 through KP8 and the HIGH and LOW indicating lamps KL and KH. The lamps KL and KH are each controlled by a single electronic switch, here shown as transistors Q8 and Q9, respectively.

The lamp KL is connected between the brightness control line and the collector of the transistor Q8, and the emitter of the transistor Q8 is returned to the source voltage +V. The base of the transistor Q8 is connected through a resistor R27 to the lead on which the negative LOW signal appears.

The transistor Q9 is similarly used to control the supply of current to the lamp KH. Its base is connected to receive the negative HIGH signal through a resistor R28.

Each of the lamps KP1 through KP8 is controlled by one of three electronic switches comprising pnp transistors. To simplify the description of circuits that are in many respects identical, the circuits for the lamps KP1 through KP4 have been shown in detail, in a block labelled DU1, and the circuits for the lamps KP5 through KP8 have been indicated schematically by a block DU2. It is to be understood that the lamps KP5 through KP8 are connected to circuits within the block DU2 in exactly the same order and manner as are the lamps KP1 through KP4 in the unit DU1. Accordingly, only the circuits for the unit DU1 will be described in detail.

As shown, each of the lamps KP1 through KP4 has one terminal connected to the brightness control terminal, at the terminal labelled e on the unit DU1. The other terminals of the lamp are each connected to a different one of the collectors of a set of four pnp transistors Q10, Q11, Q12 and Q13. The emitters of all of these transistors are connected together and to a terminal f of the unit DU1.

The base of the transistor Q10 is connected to receive the negative signal 1P through a resistor R29. The same signal is applied to the base of the corresponding transistor for the lamp KP5 in the unit DU2.

The base of the transistor Q11 receives the signal 2P through a resistor R30. The same signal controls the transistor for the lamp KP6 in the unit DU2.

The transistor Q12 receives the signal 3P through a resistor R31. The same signal controls the transistor for the lamp KP7 in the unit DU2.

The transistor Q13 receives the signal 4P through a resistor R32. The same signal is applied to the transistor for controlling the lamp KP8 in the unit DU2.

The terminal f of the unit DU1 is connected to the collector of a pnp transistor Q14. The corresponding terminal of the unit DU2 is connected to the collector of a transistor Q15.

The emitters of the transistors Q14 and Q15 are connected together to the collector of a pnp transistor Q16. The emitter of the transistor Q16 is connected to receive the supply voltage +V.

The base of the transistor Q16 receives the signal INDICATOR ENABLE. When that signal is at ground potential, the transistor Q16 is conducting and enables one or the other of the transistors Q14 and Q15 to conduct depending on the signals at the bases of those transistors.

The base of the transistor Q14 receives the negative signal B1 through a resistor R33. The base of the transistor Q15 receives the signal B2 through a resistor R34.

It will be apparent that no plug indicator lamp will be lit unless the indicator enable line is low. Whether one of the lamps in the unit DU1 or one of the lamps in the unit DU2 is lit depends on whether the lead labelled $\overline{\text{B1}}$ or the lead labelled $\overline{\text{B2}}$ is low. Which of the lamps in the selected unit DU1 or DU2 is lit depends on which of the signals 1T through 4T is low. The operation of this portion of the apparatus will be discussed below in connection with the operation of the system as a whole.

Figure 10:
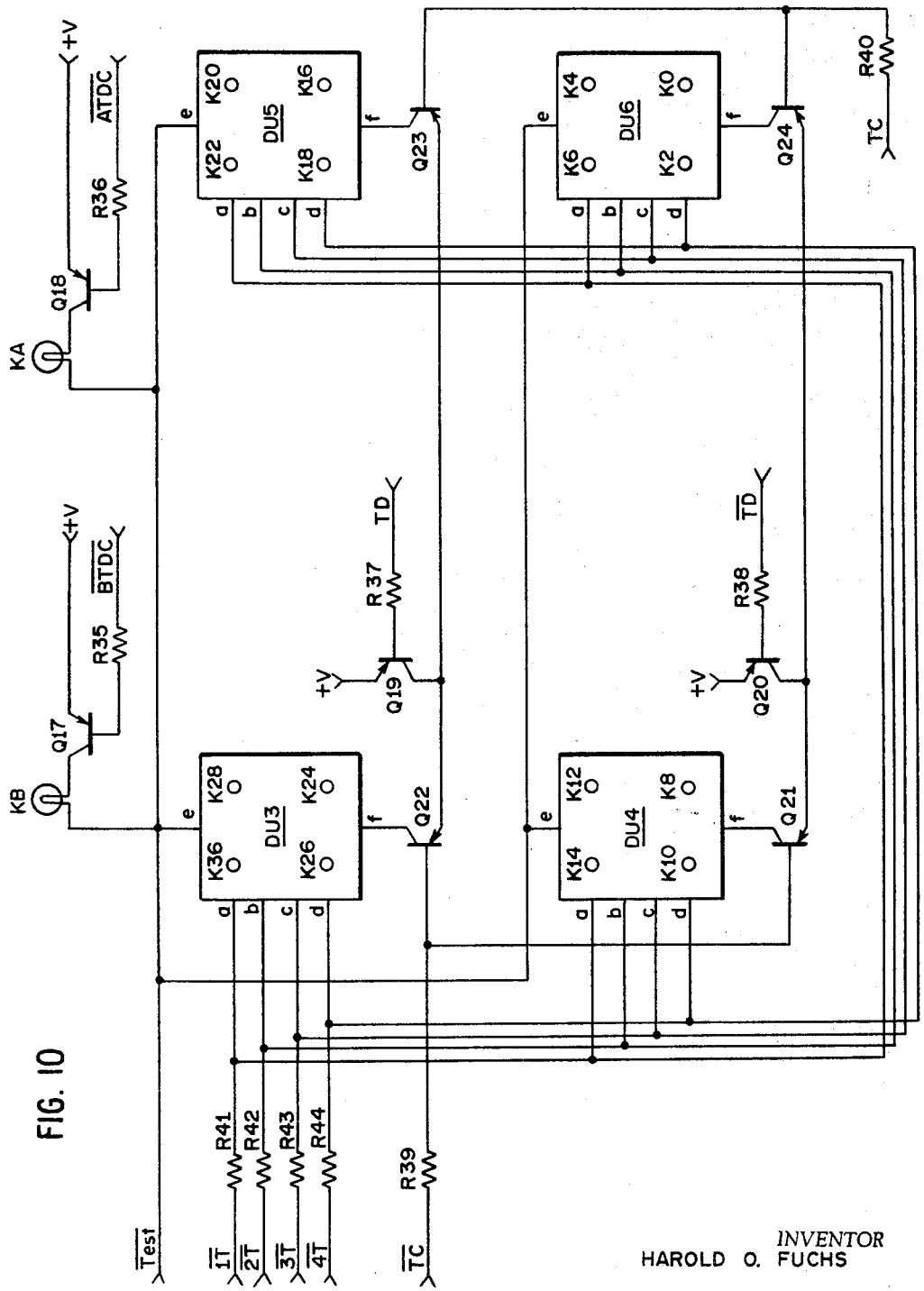
FIG. 10 is a schematic wiring diagram of a timing angle indicator forming a part of the apparatus of FIG. 3.

FIG. 10 shows the circuits for the indicating lamps KA and KB, and for the angle indicating lamps K0 through K30. The lamp KB is connected between the terminal on which the negative signal TEST appears, as described above in connection with FIG. 4, and the collector of a transistor Q17. The emitter of the transistor Q17 receives the supply voltage +V. The base of the transistor Q17 is connected to the lead labelled $\overline{\text{BTDC}}$ through a resistor R35.

The lamp KA is connected between the TEST lead and the collector of a transistor Q18. Its emitter is also returned to the supply voltage +V. The base is connected to receive the signal ATDC through a resistor R36. By this arrangement, in the TEST position of the switch S4, the lamp KB will be illuminated at all times unless the first plug fires at or beyond top dead center, both the lamps KB and KA will be extinguished if firing is at top dead center, and the lamp KA will go on each time a firing occurs after top dead center.

The firing angle indicator lamps K0 through K30 are controlled by switching circuits essentially like those used to control the spark indicating lamps KP1 through KP8 in FIG. 9. The circuits are shown in FIG. 10 as comprising four units DU3, DU4, DU5 and DU6 that may be identical with the unit DU1 shown and described in connection with FIG. 9.

The unit DU3 contains the lamps K30, K28, K26 and K24 and their associated transistors connected as are the corresponding transistors Q10 through Q13 in FIG. 9. Similarly, the unit DU4 contains the lamps K14 through K8, the unit DU5 contains the lamps K22 through K16 and the unit DU6 contains the lamps K6 through K0.

The particular lamp to be illuminated is selected by a switching matrix including six pnp transistors Q19, Q20, Q21, Q22, Q23 and Q24, together with the transistors within the units DU3 through DU6, the latter each controlling one of the indicator lamps.

Each of the transistors Q19 and Q20 has its emitter returned to the supply voltage +V. The base of the transistor Q19 is connected to the lead on which the signal TD appears through a resistor R37. The base of the transistor Q20 is connected to the lead labelled $\overline{TD}$ through a resistor R28.

The collector of the transistor Q19 is connected to the emitters of the transistors Q22 and Q23. The collector of the transistor Q20 is connected to the emitters of the transistors Q21 and Q24. Each of these transistors Q21, Q22, Q23 and Q24 has its collector connected to the terminal $f$ of the corresponding unit DU3, DU4, DU5 or DU6.

The bases of the transistors Q21 and Q22 are connected to the lead on which the signal $\overline{TC}$ appears through a resistor R39. The bases of the transistors Q23 and Q24 are connected to the lead on which the signal TC appears through a resistor R40. The input terminals $a$ of each of the units DU3, DU4, DU5 and DU6 are connected to the lead on which the signal $\overline{1T}$ appears through a resistor R41. Similarly, the input terminals $b$ are connected to the lead on which the signal $\overline{2T}$ appears through a resistor R42, the terminals $c$ are connected to a lead on which the signal $\overline{3T}$ appears through a resistor R43, and the terminals $d$ are connected to the terminal on which the signal $\overline{4T}$ appears through a resistor R44.

With the switch S4 in FIG. 4 in its TEST position, the lead labelled $\overline{TEST}$ will be at a low potential and the display apparatus of FIG. 10 will be enabled for operation. Depending on the state of the flip-flops F7 and F8 in FIG. 8, one or the other of the indicating lamps KA and KB in FIG. 10 may be illuminated. If the flip-flop F13 in FIG. 8 is reset, the transistor Q20 in FIG. 10 will be turned off by a positive potential supplied to its base and the transistor Q19 will be enabled by the ground level applied to its base. Under these conditions, one of the lamps in the units DU3 and DU5 can be illuminated and none of the lamps in the units DU4 and DU6 can be lit.

The input terminals $a$ of the units DU3 through DU6 are each connected to receive the signal $\overline{1T}$ through a resistor R41. Similarly, the signals $\overline{2T}$, $\overline{3T}$ and $\overline{4T}$ are applied to the input terminals $b$, $c$ and $d$, respectively, of these units through resistors R42, R42 and R44, respectively. It will be apparent that by this arrangement the lamp to be illuminated is selected in dependence on the state of the flip-flops F8 through F13 in FIG. 11.

Having described the construction of the preferred embodiment of my invention, its operation under typical conditions will next be described. For purposes of the description, it will be assumed that the apparatus is connected to the ignition system of a four cylinder engine, and that the switch S4 is in its TEST position. Assuming that the switch S1 in FIG. 1 is closed, and that the engine is idling, the vibration damper 31 will be rotating in the direction of the arrow. Each time the piston in the first cylinder approaches top dead center, a series of 17 timing mark pulses TM will be generated. Each time a plug is fired, the signal S shown in FIG. 2 will be generated and applied to the apparatus. Each time the first plug is fired, a negative-going pulse P1 will appear on the lead 17.

Assume that the switches S2 and S3 in FIG. 4 are set to provide a pulse at the output of the one-shot multivibrator OS2 slightly shorter than a normal spark pulse, and that the switch S3 is set to provide an output of the multivibrator OS3 that is slightly longer than the proper spark duration. The switch S5 will be set to the position shown in FIG. 7.

The condition of the various circuits when the apparatus is first turned on is not material, as they are synchronized during operation. Any erroneous indications that may appear on the indicating panel will be replaced by proper indications after the first cycle or two of engine operation.

Operation will be described beginning with the firing of spark plug No. 1. As the breaker points 5 in FIG. 1 open, the radio frequency oscillatory discharge shown at FIG. 2a will be produced in the primary circuit, and the secondary signal S will go sharply negative as shown in FIG. 2b. This negative transient is coupled, through the capacitive coupling indicated as C2 in FIG. 1, to the input of the digital filter 41 shown in FIG. 4. At substantially the same time, the negative pulse P1 will appear on the high tension lead 13 for the first cylinder, and that will be applied over the lead 17 to the counter control gates 53 in FIG. 7.

Considering first the operation of the digital filter, a negative-going transient S will turn on both the transistors Q2 and Q3, causing their collectors to go positive. The gates 73 and 75 will both produce negative-going pulses. The multivibrator OS1 will produce a positive output pulse, and it will be applied to the gate 81 and through the capacitor C8 to the brightness control.

An inverted pulse appearing at the output of the gate 81 will set the flip-flop F1, causing its logic 1 output terminal to go high and its logic 0 terminal to go to ground. A negative pulse will be produced across the resistor R9 that will trigger the multivibrators OS2 and OS3, causing them to produce their reference pulses.

When the radio frequency oscillations in the spark circuit are damped below the value necessary to maintain a spark discharge, the spark is extinguished and the low frequency damped oscillations begin, as at the point B in FIG. 2, a series of negative pulses S will be applied to the digital filter in FIG. 4, of sufficient amplitude to cause the transistor Q3 to conduct sufficiently to produce a negative output pulse from the gate 75, but not causing the transistor Q2 to conduct sufficiently to enable the gate 73 to produce a pulse. A negative pulse from the gate 75 will reset the flip-flop F1, causing its logic 1 output terminal to go to ground and its logic 0 output terminal to go to a positive potential.

If the flip-flop F1 is reset before the end of the pulse produced by the multivibrator OS3, the gate 87 will still be disabled by the low output from the gate 91. Accordingly, the flip-flop F3 will not be set. If it occurs after the end of the pulse from the multivibrator OS3, indicating a low resistance spark circuit caused by a spark plug gap that is too small, a rich fuel mixture, a fouled plug or a shorted plug, or very high pressures that might be caused by detonation in the cylinder, the gate 87 will be enabled and the flip-flop F3 will be reset. Its logic 1 output terminal will thereby go to ground, disabling the gate 93 and turning on the lamp KL in FIG. 9.

The output of the gate 93 will now be positive with respect to ground, and the indicator enable lead will be positive, cutting off the transistor Q16 in FIG. 9 and preventing the illumination of any of the plug indicating lamps.

Should the flip-flop F1 be reset before the end of the short pulse produced by the multivibrator OS2, the gate 89 will be enabled to set the flip-flop F4. Its logic 0 output terminal will then go to ground, lighting the lamp KH in FIG. 9 and disabling the gate 93. Under these abnormal conditions, the plug indicating lamps are not lit.

If the pulse width produced by the digital filter 41 is normal, the flip-flop F3 will remain set and the flip-flop F4 will remain reset. The gate 93 will be enabled to produce a low on the indicator enable line, permitting the plug indicating lamps to be lit. The same negative pulse across the resistor R9 that triggers the multivibrators OS2 and OS3 resets the flip-flop F4 and sets the flip-flop F3.

When the multivibrator OS2 is triggered, it produces a positive plug count pulse that is applied to the gate 97 in FIG. 7 together with the positive voltage appearing on the collector of the transistor Q7 when the plug 1 fires. The gate 97 will thereby produce a negative output pulse, disabling the gate 99 and applying a start signal to the pulse sequence generator 55.

A negative pulse appearing across the resistor R22 will cause the output of the gate 103 to go positive, to produce a positive-going transient across the resistor R23 that will cause the gate 105 to produce the negative STORAGE RESET pulse. That pulse will set the flip-flop F5 to produce the PLUG COUNT ENABLE signal and remove the TIMING COUNT ENABLE signal.

At the same time, the flip-flops F8 through F13 in FIG. 8 will be reset. In that state, each of the leads labelled $\overline{1T}$ through $\overline{4T}$ will be positive, and no timing indicator lamps will be lit.

Next, a positive transient across the resistor R24 in FIG. 7 will cause the gate 107 to produce the negative TRANSFER pulse. This pulse will transfer the contents of the counter 51 in FIG. 8 to the timing count register 65 through the gates 59. Assuming that the apparatus has just been started, the count that may be transferred at this time is of no significance.

Referring again to FIG. 7, the negative TRANSFER pulse will cause a positive output from the gate 109 that is differentiated by the capacitor C13 and the resistor R24 to cause the gate 111 to produce a negative-going COUNTER RESET pulse. This pulse will set the counter 51 in FIG. 8 to a binary count of 0, corresponding to the count for the first plug. The counter is now in synchronism.

At this time, with both the flip-flops C1SF and C2SF reset, the gate 117 will be enabled to produce the signal 1P at ground potential. At the same time, with the counter flip-flop C3SF reset, the leads labelled C3 in FIGS. 7 and 8 will be at ground potential and the leads labelled $\overline{B1}$ in FIGS. 7 and 9 will be at ground potential.

It should be noted that the positive voltage appearing at the logic 1 output terminal of the flip-flop F5 at this time is isolated from the lamp enabling circuits by the diode CR2 in FIG. 7. Referring to FIG. 9, assuming that the indicator enable lead is at ground potential because the spark is neither too long nor too short, the transistor Q16 will be conducting and the transistor Q14 will be conducting because its base is held below the emitter potential by the ground on the lead labelled $\overline{B1}$. The transistor Q10 will be rendered conducting by the low potential on the lead labelled $\overline{1T}$. Accordingly, the lamp KP1 will be illuminated. Its brightness will be controlled as a function of time by the brightness control 45 in FIG. 4.

When the second plug fires, the signal S will be produced but the signal P1 will not be produced. The digital filter 41 will again produce output pulses and apply them to the pulse width comparator, in which the pulse duration will again be measured. At the beginning of this comparison, the flip-flops F3 and F4 will be set and reset, respectively, so that the proper plug lamps will be lit if the comparison shows that the spark width is within tolerance and will not be lit if it is outside of tolerance.

At the PLUG COUNT pulse produced by the multivibrator OS2 at the beginning of the pulse width measurement period, the gate 99 in FIG. 7 will be enabled. The gate 97 will be disabled at this time, by the low potential appearing across the resistor R21. The gate 99 will produce a negative count pulse to set the flip-flop C1SF in FIG. 8. That will cause the gate 119 to produce a low output signal 2P and will cause the gate 117 to be disabled. The lamp KP1 in FIG. 9 will go out, and the lamp KP2 will be lit when the transistor Q11 goes into conduction.

When the third plug fires, the operation will be the same as for the second plug. The count pulse produced by the gate 99 in FIG. 7 will step the counter by resetting the flip-flop C1SF. When the logic 1 terminal of the flip-flop C1SF goes toward ground, the flip-flop C2SF will be set. The gate 121 will produce a ground level output signal, causing the lamp KP3 to be lit.

When the fourth plug fires, the COUNT pulse produced by the gate 99 will set the flip-flop C1SF. The gate 123 in FIG. 8 will now produce a ground level signal. At this time, the counter flip-flop C3SF is still reset. Accordingly, the terminal labelled $\overline{C3}$ will be at a positive potential.

Referring to FIG. 7, with the lead labelled $\overline{4P}$ at ground potential the gate 115 will produce a positive output signal to enable the gate 113. The second terminal of the gate 113 receives a positive voltage from the terminal labelled $\overline{C3}$ over the deck S5b of the switch S5. The flip-flop S5 will now be reset.

The PLUG COUNT ENABLE signal will be removed, and the TIMING COUNT ENABLE signal will be produced. When the plug count enable lead shown in FIGS. 7 and 8 goes low, the gates 57 will be disabled. All of the output terminals will go positive, except for the gate 123. Its output terminal will be forced low by the low voltage at the logic 1 output terminal of the flip-flop F5 applied to the output terminal of the gate 123 through the deck S5c of the switch S5 in FIG. 7. This action will keep the transistor Q13 in FIG. 9 in conduction, lighting the lamp KP4, during the timing count cycle which ensues. Should the fourth plug fire out of tolerance, however, the INDICATOR ENABLE signal would not be present at ground potential, so that the lamp KP4 would not be lit if either of the out-of-tolerance indicating lamps KL or KH was lit.

When the flip-flop F5 is reset, a negative COUNTER SET pulse is produced across resistor R25 in FIG. 7. That pulse will set the first three stages C1SF, C2SF and C3SF of the counter 51.

No further action will take place until the piston in the first cylinder reaches 30 degrees from top dead center and the pulse generator produces the first timing pulse TM. This pulse will be applied to the gate 101 in FIG. 7 and produce a count pulse that will step the counter by resetting the flip-flop C1SF. Resetting this flip-flop will cause the flip-flop C2SF to be reset, and resetting the flip-flop will cause the flip-flop C3SF to be reset.

The negative-going transition at the logic 1 output terminal of the flip-flop C3SF will cause the flip-flop C4SF to be set. A low voltage appearing at the logic 0 output terminal of the flip-flop C4SF will set the flip-flop F6. At the same time, the COUNTER SET pulse will reset the flip-flop F7 if it is set, producing a low on its logic 1 output terminal to disable the gate 139 and cause the lamp KB in FIG. 10 to be lit.

The succeeding timing pulses TM that occur before the first plug fires will step the first four stages of the counter 51 in ascending binary sequence from the state to which they were set by the COUNTER SET pulse. The eighth timing mark pulse will set the counter 51 to the state in which each of the flip-flops C1SF through C4SF is set and the flip-flop F6 remains set.

On the ninth timing mark pulse, the first four stages of the counter will be reset but the flip-flop F6 will remain set. If the sixteenth timing mark pulse is transferred into the counter 51 before the first plug fires, the spark sense decorder 61 will be enabled to set the flip-flop F7 and will cause the lamp KB to be extinguished. As described above, if the first plug then fires both lamps KB and KA will remain out indicating firing at top dead center. However, if the seventeenth timing mark pulse is produced before the first plug fires, the lamp KA will be illuminated.

Assume that the tenth timing mark pulse occurs and that the first plug then fires. At that time, the flip-flop C1SF will be rest, the flip-flops C2SF, C3SF and C4SF will be reset, and the flip-flop F6 will be set.

When the first plug fires, the sequence generator will be actuated as described above. The STORAGE RESET pulse will reset the flip-flops F8 through F13 in FIG. 8, and the TRANSFER pulse will then transfer the contents of the counter 51 to the register 65.

With the counter 51 in the state assumed, of the transfer gates 59 the gate 125 will be disabled by the low voltage on the lead $\overline{C1}$, and the gates 129 and 131 will be disabled by the low voltage on the lead labelled C2. The gate 127 will be enabled and the flip-flop F9 will be set. The gates 133 and 135 will be enabled to set the flip-flops F12 and F13. The leads labelled $\overline{2T}$, $\overline{TC}$ and $\overline{TD}$ will be at a low potential.

Under these conditions, referring to FIG. 10, the transistors Q20 and Q21 will be conducting to enable the selection of a lamp in the unit DU4. Since the lead labelled $\overline{2T}$ is at a low potential, the input terminal b of this unit will be at a low potential, allowing the lamp K12, indicating firing 12 degrees before top dead center, to be lit. This lamp will remain illuminated until the next storage reset pulse that will follow after another firing sequence and another timing count sequence.

FIG. 11 shows a modification of the pulse width comparator of my invention. In accordance with this embodiment, the lead 17 on which the signal S appears is applied to the input terminal of an amplifier 137 and having a high input impedance. The output signal from the amplifier 137 is applied in parallel to a high pass filter 139 and a low pass filter 141. The high pass filter 139 is tuned to respond to the radio frequency oscillations appearing at the start of the spark when the breaker points open, and the low pass filter 141 is tuned to the audio frequency oscillation that occurs when the breaker points close. The output of the filter 139 sets the flip-flop F1, and the output of the filter 141 resets the flip-flop, to produce pulses having a duration equal to the spark duration for purposes described above.

The output terminals of the flip-flop F1 may be connected to a pulse width comparator of the type shown at 43 in FIG. 4. Alternatively, a pulse width comparator of the type shown in FIG. 11 may be employed.

Referring to FIG. 11, a binary counter diagrammatically shown at 147 is arranged to be reset by the negative pulse appearing on the logic 0 output terminal of the flip-flop F1 when it is set. For this purpose, a suitable coupling capacitor C16 is provided. At the same time, the positive voltage appearing on the logic 1 output terminal of the flip-flop F1 is employed to enable a free-running multivibrator 143.

Preferably, the multivibrator 143 is provided with a pulse rate control 145 of any conventional construction. Pulses from the multivibrator will step the counter 147 until the end of the spark when the flip-flop F1 is reset.

The outputs of the counter 147 are detected by a low count decoder 151 and a high count decoder 149.

The low count decoder may be a conventional array of logical gates that will produce an output signal for any count of the counter 147 below a predetermined number. This decoder will produce a very brief output signal for each spark, but without any deleterious effect. If desired, a gate could be included to disable the low count decoder 151 while the flip-flop F1 was set, to prevent it from responding during the timing of the pulse.

The high count decoder 149 would be arranged to respond to any count above a predetermined count. The decoder 149 would thereby produce an output negative labelled $\overline{LOW}$ if the spark duration was long enough to permit too high a count in the counter 147, indicating a low resistance spark circuit. Similarly, the low decoder 151 would produce a low level HIGH signal if the spark duration was too short. A NAND gate 153 connected to the output terminals of both decoders could provide the INDICATOR ENABLE signal required elsewhere in the apparatus.

FIG. 12 shows a modification of the spark monitoring apparatus of my invention in which the amplitude of the spark rather than its duration is measured. I have found that there is a direct correlation between the amplitude of the discharge and the duration, and that a long spark characterized by a low resistance path is associated with a low amplitude, whereas the short spark characteristic of a high impedance spark circuit is generally associated with a high amplitude.

To measure the spark amplitude, I provide a pair of flip-flops F14 and F15. These may be of the type shown in FIG. 6.

The set terminals of the flip-flops F14 and F15 are coupled across the breaker points 5 by a capacitor C17. A negative pulse developed when the breaker points first open thereby causes the flip-flops F14 and F15 to be set at the start of a spark.

The logic 1 output terminal of the flip-flop F14 supplies the signal labelled $\overline{HIGH}$ used in the other apparatus described above in connection with FIGS. 1–10, and supplies one input signal to the indictor enabling NAND gate 155. The second terminal of this gate is connected to the logic 0 output terminal of the flip-flop F15, and this terminal also supplies the negative LOW signal required by the other apparatus.

The reset terminal of the flip-flop F14 is connected to the output terminal of a conventional Schmitt trigger circuit ST1 that is arranged to produce a negative output pulse when a sufficiently large input signal is supplied to it. The input terminal of the Schmitt trigger ST1 is connected to the wiper of potentiometer P1, across which the signal S is applied. The potentiometer P1 is set to provide a signal sufficient to trigger the Schmitt trigger ST1 when and only when the spark amplitude is too high.

A second Schmitt trigger ST2 has its output terminal connected to the reset terminal of the flip-flop F15. The input terminal of the Schmitt trigger ST2 is connected to the wiper of a potentiometer P2, across which the signal S also appears. The potentiometer P2 is set to cause the Schmitt trigger ST2 to fire on any normal spark that occurs, or on any higher amplitude spark.

The operation of the embodiment shown in FIG. 11 will next be described. Assuming that the breaker points 5 are open, with the engine in operation, the flip-flops F14 and F15 will be set. Assuming that a spark of low amplitude insufficient to trigger either of the Schmitt triggers is produced, the flip-flops F14 and F15 will remain set. The logic 0 output terminal of the flip-flop F15 will go to ground, disabling the gate 155 and enabling the LOW indicating lamp KL in FIG. 1.

That condition of the apparatus will be maintained until the next spark occurs. Supposing that it is of normal duration, the Schmitt trigger ST2 will be fired but the Schmitt trigger ST1 will not. The outputs of the Schmitt triggers are arranged to be longer in duration than the negative pulse which causes the flip-flops F14 and F15 to be set. Accordingly, the flip-flop F14 will remain set and the flip-flop F15 will be reset.

During the brief period in which the flip-flop F15 was set before it was reset, a LOW indication would be produced, but this would quickly be removed by the resetting of the flip-flop. The gate 155 would be enabled to produce the LOW level permitting the plug lamp indicators to be lit.

That condition would remain until the next spark occurs. Assuming that that spark was of high enough amplitude to trigger both Schmitt triggers, the flip-flop F15 would be reset and the flip-flop F14 would be reset. The logic 1 output terminal of the flip-flop F14 would go low, enabling the high resistance indicating lamp KH to be illuminated and disabling the gate 155. Operation of the rest of the apparatus shown in FIGS. 1–10 would be the same.

While I have described my invention with respect to the details of a preferred embodiment and various modifications thereof, many changes and variations will occur to those skilled in the art upon reading my description, and such can obviously be made without departing from the scope of my invention.

Having thus described my invention, what I claim is:

1. An engine performance monitor for an engine having a spark ignition system, comprising, in combination, a register settable to first and second states, sensing means adapted to be coupled to the high tension lead of the ignition coil in the engine to be monitored for producing a first signal in accordance with the electrical waveform induced on the high tension lead each time an ignition spark is produced, means controlled by said sensing means and responsive to the radio frequency transient appearing in said first signal at the beginning of each spark for setting said register to its first state, means controlled by said sensing means and responsive to the audio frequency transient appearing in said first signal at the end of each spark for setting said register to its second state, first pulse generating means actuated by said register when set to its first state for producing a first pulse having a duration longer than a first predetermined time characteristic of a normal spark, second pulse generating means actuated by said register when set to its first state for producing a second pulse having a duration shorter than a second predetermined time less than said first predetermined time and characteristic of a normal spark, first signal generating means controlled by said register and said first pulse generating means for producing a signal indicative of an unduly long spark when said register is in its first state and said first pulse is absent, and second signal generating means controlled by said register and said second pulse generating means for producing a signal indicative of an unduly short spark when said register is in its second state and said second spark is present.

2. Apparatus for testing the performance of an electrical ignition system of the spark discharge type in which each normal spark discharge produced is characterized by a duration between a first duration and a second shorter duration, said apparatus comprising a register settable to first and second states, means adapted to be connected to said ignition system and responsive to radio frequency transients produced at the beginning of each spark discharge for setting said register to its first state, means adapted to be connected to said ignition system and responsive to audio frequency transients produced at the end of each spark discharge for setting said register to its second state, first pulse generating means actuated by said register when set to its first state for producing a first pulse of said first duration, a second pulse generating means actuated by said register when set to its first state for producing a second pulse of said second duration, first signal generating means controlled by said register and said first pulse generating means for producing an output signal indicative of an unduly long spark when said register is in its first state and said first pulse is absent, and second signal generating means controlled by said register and said second pulse generating means for producing an output signal indicative of an unduly short spark when said register is in its second state and said second pulse is present.

3. Apparatus for testing the performance of a multiple cylinder engine having a spark ignition system of the type comprising an ignition coil having a high tension lead coupled to spark plugs in the several cylinders by a distributor and having breaker points opened at intervals to produce a sparking potential on said high tension lead that is applied to the spark plug selected by the distributor, said plugs being periodically excited in a predetermined sequence from a first plug to a last plug, said apparatus comprising, in combination, impedance sensing circuit means adapted to be electrically coupled to the high tension lead of the spark coil for producing a performance signal having a characteristic determined by the impedance of the discharge path for each spark produced, pulse generating means adapted to be connected to the first plug in said sequence for producing a reference pulse each time the first plug is excited, an ordered sequence of indicating means each operable to first and second states, one for each plug in the engine to be tested, a counter responsive to a sequence of applied counting pulses to sequentially assume a set of different states comprising at least one state for each indicating means, means controlled by said pulse generating means and said impedance sensing means for setting said counter to a reference one of said states each time a reference pulse and a performance signal are produced, means controlled by said pulse generating means and said impedance sensing means for applying a counting pulse to said counter each time a performance signal is produced and a reference pulse is not produced, and means controlled by said impedance sensing means and said counter for operating each indicating means to its first or its second state when an associated plug is excited in dependence on said characteristic of the performance signal produced by said impedance sensing means.

4. Performance monitoring apparatus for a spark ignited engine having a high tension lead on which a characteristic waveform appears each time an ignition spark discharge is produced, said waveform being characterized by a damped radio frequency transient beginning at the start of each discharge and a damped audio frequency transient beginning at the end of each discharge, said apparatus comprising, in combination, first circuit means adapted to be coupled to said high tension lead and responsive to each radio frequency transient for producing a first signal marking the start of each spark discharge, second circuit means adapted to be coupled to said high tension lead and responsive to each audio frequency transient for producing a second signal marking the end of each spark discharge, and third circuit means controlled by said first and second circuit means for producing a performance signal for each first and second signal having a characteristic determined by the interval between the first signal and the second signal.

5. The apparatus of claim 4, in which said first circuit means comprises a high pass filter, said second circuit means comprises a low pass filter, and said third circuit means comprises a flip-flop connected to said filter to be set to a first state by a signal from said high pass filter and to a second state by a signal from said low pass filter.

6. The apparatus of claim 4, in which said first circuit means comprises a first electronic switch, means normally biasing said switch to a first state, first impedance means coupled to said high tension lead and responsive to each radio frequency transient to bias said switch temporarily to a second state, and pulse generating means actuated by said first electronic switch in its second state for producing a pulse of predetermined duration, in which said second circuit means comprises a second electronic switch, means normally biasing said second switch to a first state, and second impedance means coupled to said high tension lead and responsive both to audio frequency and radio frequency transients to bias said second switch to its second state for a time less than the predetermined duration of said pulse, and in which said third circuit means comprises a register connected to said second switch and said pulse generating means and set to a first state by said pulse when said second switch is in its first state and set to a second state when said second switch is in its second state and said pulse is absent.

7. Performance monitoring apparatus for a spark ignited engine having a high tension lead on which a characteristic wave-form appears each time an ignition spark discharge is produced, said waveform being characterized by a radio frequency transient beginning at the start of each spark discharge and an audio frequency transient beginning at the end of each spark discharge, said apparatus comprising, in combination, impedance sensing means adapted to be coupled to said high tension lead and responsive to the transients appearing on said lead to produce a performance signal in accordance with the impedance of the spark discharge circuit, a register, and means controlled by said impedance sensing means for setting said register in accordance with said performance signal, and wherein said impedance sensing means comprises first circuit means adapted to be coupled to said high tension lead and responsive to radio frequency transients to produce a first signal, second circuit means adapted to be coupled to said high tension lead and responsive to both radio frequency and audio frequency transients to produce a second signal, and third circuit means responsive to said first and second signals for setting said register to a first state when both signals are present and setting said register to a second state when said second signal is present and said first signal is absent.

8. The apparatus of claim 7, in which said register comprises first and second flip-flops, said apparatus further comprising means adapted to be coupled to the ignition circuit of the engine to be monitored for setting said flip-flops to a reference state each time a spark is produced, and in which said impedance sensing means comprises first and second trigger circuit means adapted to be coupled to said high tension lead, said first trigger circuit means being responsive to transients above a predetermined first level indicative of a high impedance spark discharge path to produce a first pulse and connected to one of said flip-flops to set it to a second state when said first pulse is produced, and said second trigger circuit means being responsive to transients above a predetermined second level indicative of a low impedance path to produce a second pulse and connected to the other of said flip-flops to set it to a second state when said second pulse is produced.

9. The apparatus of claim 7, in which said impedance sensing means comprises a high pass filter and a low pass filter adapted to be coupled to said high tension lead, said high pass filter being connected to said register to set it to a first state in response to each radio frequency transient, and said low pass filter being connected to said register to set it to a second state in response to each audio frequency transient.

10. The apparatus of claim 9, further comprising first pulse generating means controlled by said register for producing a first pulse having a first duration shorter than a normal spark when said register is set to said first state, second pulse generating means controlled by said register for producing a second pulse having a second duration longer than a normal spark when said register is set to said second state, first gate means controlled by said register and said first pulse generating means for producing a first signal when said register is in its second state and said first pulse is present, and second gate means controlled by said register and said second pulse generating means for producing a second signal when said register is in its first state and said second pulse is absent.

11. The apparatus of claim 7, further comprising counting means responsive to a series of applied pulses to register the number of pulses applied, means responsive to the setting of said register to its first state to set said counter to a reference state, pulse generating means controlled by said register in its first state for applying pulses to said counter, means controlled by said counter for producing a first signal when the number registered by the counter is below a predetermined first number, and means controlled by said counter for producing a second signal when the number registered by the counter is above a predetermined second number larger than said first number.

12. In an engine performance monitor for a multiple cylinder engine having a spark ignition system including a main high tension lead, an individual high tension lead connected to a spark plug in each cylinder, a distributor for successively connecting the individual high tension leads to the main high tension lead in a predetermined firing order, and a shaft rotating in synchronism with the engine, the combination comprising, first circuit means coupled to the main high tension lead for producing a pulse each time a spark is produced, second circuit means coupled to the individual high tension leads for a reference cylinder for producing a pulse each time a spark is produced in the reference cylinder, pulse generating means coupled to the shaft for producing a series of timing pulses each occurring at a different position of the piston in the reference cylinder, a pulse counter, first gate means controlled by said first and second circuit means and responsive to a pulse from both circuit means to produce a control pulse, means controlled by said first gate means for setting the counter to a reference state when said control pulse is produced, a register settable to first and second states, means controlled by said first gate means for setting said register to its first state when said control pulse is produced, second gate means controlled by said first and second circuit means and said register and responsive to a pulse from said first circuit means when no pulse is produced by said second circuit means and said register is in its first state for applying a pulse to said counter, means controlled by said counter when a spark is produced in the cylinder firing just before the reference cylinder for setting said register to its second state, and third gate means controlled by said register and said pulse generating means for applying a pulse to said counter in response to each timing pulse when said register is in its second state.

13. The apparatus of claim 12, further comprising a first set of indicator lamps, one for each cylinder, and means controlled by said counter and said register for energizing said lamps in sequence as said counter is pulsed when said register is in its first state.

14. The apparatus of claim 12, in which said first circuit means comprises means for producing a signal indicative of the impedance in the spark discharge circuit when a spark is produced, and further comprising an indicator lamp for each cylinder and means controlled by said counter, said register, and said first circuit means for energizing each lamp when a spark is produced in a corresponding cylinder with said register in its first state and said signal has a predetermined characteristic.

References Cited

UNITED STATES PATENTS

| | | | |
|---|---|---|---|
| 2,324,458 | 7/1943 | Peters et al. | 324—62 X |
| 2,959,732 | 11/1960 | Lindberg | 324—16 |
| 2,962,654 | 11/1960 | Wilson | 324—15 |

RICHARD C. QUEISSER, Primary Examiner

JERRY W. MYRACLE, Assistant Examiner

U.S. Cl. X.R.

324—16